US010358252B2

(12) United States Patent
Hanan et al.

(10) Patent No.: US 10,358,252 B2
(45) Date of Patent: *Jul. 23, 2019

(54) PLASTIC CONTAINER WITH STRAPPED BASE

(71) Applicant: Niagara Bottling, LLC, Ontario, CA (US)

(72) Inventors: Jay Clarke Hanan, Ontario, CA (US); Jochen Forsthovel, Regensburg (DE); Alexander Schau, Regensburg (DE)

(73) Assignee: Niagara Bottling, LLC, Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,109

(22) Filed: Aug. 3, 2015

(65) Prior Publication Data

US 2015/0336703 A1     Nov. 26, 2015

Related U.S. Application Data

(63) Continuation of application No. 14/141,224, filed on Dec. 26, 2013, now Pat. No. 9,132,933.

(60) Provisional application No. 61/746,535, filed on Dec. 27, 2012.

(51) Int. Cl.
| | |
|---|---|
| *B65D 1/44* | (2006.01) |
| *B65D 1/02* | (2006.01) |
| *B65D 1/42* | (2006.01) |
| *B29L 31/00* | (2006.01) |
| *B29C 49/06* | (2006.01) |

(52) U.S. Cl.
CPC .............. *B65D 1/44* (2013.01); *B65D 1/0284* (2013.01); *B65D 1/42* (2013.01); *B29B 2911/14013* (2013.01); *B29B 2911/14333* (2013.01); *B29B 2911/14486* (2013.01); *B29C 49/06* (2013.01); *B29L 2031/7158* (2013.01); *B65D 2501/0027* (2013.01); *B65D 2501/0036* (2013.01); *B65D 2501/0081* (2013.01)

(58) Field of Classification Search
CPC ........ B65D 1/44; B65D 1/42; B29B 11/14486
USPC .......................... 220/669–671; 215/381, 382
See application file for complete search history.

(56) References Cited

U.S. PATENT DOCUMENTS

| | | | |
|---|---|---|---|
| 2001/0027978 A1* | 10/2001 | Finlay | ...................... B65D 1/44 220/669 |
| 2008/0223816 A1* | 9/2008 | Darr | ..................... B65D 1/0223 215/382 |
| 2011/0132863 A1* | 6/2011 | Dorn | .................... B65D 1/0223 215/10 |

* cited by examiner

*Primary Examiner* — Anthony D Stashick
*Assistant Examiner* — Raven Collins
(74) *Attorney, Agent, or Firm* — Rutan & Tucker LLP; Hani Z. Sayed

(57) ABSTRACT

A container may have a base, a sidewall connected to the base, a bell connected to the sidewall, and a finish connected to the bell. The base may have strap ribs to resist deformation of the base. The sidewall may have recessed columns to resist bending, leaning, crumbling, and/or stretching. The strap ribs and recessed columns may vertically line up along a central axis of the container to communicate forces on the container vertically along the container to continuously resist deformation in the base and the sidewall.

17 Claims, 30 Drawing Sheets

PLASTIC CONTAINER WITH STRAPPED BASE

CROSS-REFERENCE TO RELATED APPLICATIONS

This application claims the benefit of U.S. Pat. No. 9,132,933 issued on Sep. 15, 2015 and U.S. Provisional Application No. 61/746,535, filed on Dec. 27, 2012, the entirety of which is incorporated herein by reference.

BACKGROUND

Field

The present application generally relates to plastic containers, particularly to plastic containers designed to hold liquids while resisting deformation.

Description of the Related Art

Plastic containers have been used as a replacement for glass or metal containers in the packaging of beverages for several decades. The most common plastic used in making beverage containers today is polyethylene terephthalate (PET). Containers made of PET are transparent, thin-walled, and have the ability to maintain their shape by withstanding the force exerted on the walls of the container by their contents. PET resins are also reasonably priced and easy to process. PET bottles are generally made by a process that includes the blow-molding of plastic preforms which have been made by injection molding of the PET resin.

Advantages of plastic packaging include lighter weight and decreased breakage as compared to glass, and lower costs overall when taking both production and transportation into account. Although plastic packaging is lighter in weight than glass, there is still great interest in creating the lightest possible plastic packaging so as to maximize the cost savings in both transportation and manufacturing by making and using containers that contain less plastic, while still exhibiting good mechanical properties.

SUMMARY

The bottling industry is moving in the direction of removing auxiliary packaging from cases or pallets. A case of bottles with film only and no paperboard is called a "film only conversion" or "lightweighting" of auxiliary packaging. The removal of supporting elements such as paperboard places additional stress on a bottle, which increases the structural demands on the bottle. In certain embodiments, a bottle design can provide one or more of the benefits of reducing bending and point loading failures. The disclosed design embodiments can alleviate the stresses during shipping and handling (including film only packaging) while maintaining ease of blow molding. In certain embodiments, a bottle design uses less resin for the same or similar mechanical performance, resulting in a lightweight product.

Embodiments of the bottle disclosed herein may use polyethylene terephthalate (PET), which has viscoelastic properties of creep and relaxation. As a plastic, PET and other resins tend to relax at temperatures normally seen during use. This relaxation is a time dependent stress relieving response to strain. Bending can provide exaggerated strains over what would be seen in tensile loading. Due to exaggerated strains, the relaxation in bending can be much more severe. Bending happens at multiple length scales. Bending can happen at the length scale of the bottle or on a small length scale. An example of the bottle length scale bending is a person bending the bottle in his/her hands, or bending experienced during packing in a case on a pallet. An example of the small scale is the flexing or folding of ribs or other small features on the wall of the bottle. In response to loads at the first, larger length scale, ribs flex at the local, smaller length scale. When they are held in this position with time, the ribs will permanently deform through relaxation.

Further, embodiments of the bottles disclosed herein may undergo pressurization. Pressure inside a bottle can be due to the bottle containing a carbonated beverage. Pressure inside a bottle can be due to pressurization procedures or processes performed during bottling and packaging. For example, a bottle can be pressurized to help the bottle retain its shape. As another example, the bottle can be pressurized with certain gases to help preserve a beverage contained in the bottle.

Embodiments of the bottles disclosed herein have varying depth ribs that achieve a balance of strength and rigidity to resist the bending described above while maintaining hoop strength, such as, for example, when pressure is not used or relieved. A collection of flattened and/or shallow depth ribs act as recessed columns in the body of the bottle that distribute bending and top load forces along the wall to resist leaning, stretching, and crumbling. The collection of flattened and/or shallow depth ribs can help the bottle retain its shape during pressurization, such as, for example, help inhibit stretching of the bottle when pressurized. Inhibiting stretching of the bottle helps retain desired bottle shape to aid in packaging of the bottles as discussed herein by, for example, maintaining a substantially constant height of the bottle. Inhibiting stretching of the bottle can help with applying a label to a label portion of the bottle. For example, with a label applied to a bottle, inhibiting stretching of the bottle helps retain a constant length or height of the bottle at the label panel portion, which can help prevent tearing of the label and/or prevent the label from at least partially separating from the bottle (i.e., failure of the adhesive between the bottle and the label). Further details on the features and functions of varying depth ribs are disclosed in U.S. patent application Ser. No. 13/705,040, entitled "Plastic Container with Varying Depth Ribs," filed on Dec. 4, 2012, now U.S. Pat. No. 8,556,098, entitled "Plastic Container Having Sidewall Ribs with Varying Depth," which claims benefit to U.S. Provisional Patent Application Ser. No. 61/567,086, entitled "Plastic Container with Varying Depth Ribs," filed on Dec. 5, 2011, the entirety of each of which is incorporated herein by reference.

A balance may be achieved between flattened and/or shallow ribs and deep ribs to attain a desired resistance to bending, leaning, and/or stretching while maintaining stiffness in a lightweight bottle. In some embodiments, at least some of the aforementioned desired qualities may be further achieved through a steeper bell portion of a bottle. A steeper bell portion can increase top load performance in a lightweight bell. A lightweight bottle body and bell leaves more resin for a thicker base of the bottle, which can increase stability. A thicker base may better resist bending and top load forces and benefits designs with a larger base diameter with respect to the bottle diameter for tolerance even when the base is damaged during packaging, shipping, and/or handling.

Embodiments disclosed herein have a base rib that can function as a strap from a base to a sidewall of the bottle to the help further achieve resistance to bending, leaning, stretching and/or flexing while maintaining stiffness. A strap rib on a base helps the base resist deformation under pressure without necessitating the base being overly heavy in weight relative to the lightweight bottle (i.e., relative to wall thickness of flat foot base that does not resist pressure as well). The strap base rib can be incorporated into a flat foot base. A flat foot base helps retain base foot thickness. Retaining base foot thickness helps retain bottle integrity during packaging and handling using lightweight packaging, such as, for example, film only packaging that requires the base to directly resist forces, including bending and point loading, during packaging, shipping, and/or handling. A flat foot base performs well with or without internal pressure due to, for example, the ability to maintain relative foot thickness in the base in a lightweight bottle. Without strap ribs, the base may have little internal pressure resistance and may rollout (pop out and create a rocker bottom). The strapped base rib helps resist damage and deformation as discussed herein without requiring a relatively heavy footed base. Without requiring a relatively heavy footed base, less material is needed for the lightweight bottle. Further, the strapped base design may allow for a relatively easier blowing process than other known pressure bases. Thus, a base with a strap rib as disclosed herein provides for a material efficient, pressure optional bottle base.

Incorporating a strap base rib into the base with column formations in the sidewall of the bottle as discussed herein offers pressure resistance for internally pressurized bottles while maintaining strength and performance (i.e., resistance to bending and leaning) when without internal pressure (i.e., pressure release by a user opening a closure of a bottle). The strap base rib can act with the column formation on the sidewall of the bottle to form straps around the bottle to communicate stresses along the height of the bottle.

The base with a strap base rib helps maintain strength and performance of the column formations for internally pressurized bottles. With a strap base rib, the resistance to bending, leaning, and/or stretching while maintaining stiffness and hoop strength is maintained without pressure while enhancing these characteristics when the bottle is pressurized. For example, a strap base rib allows the utilization of a flat foot base for better base strength during processing at a plant (i.e., adding beverage contents), while preventing rollout or popping out of the base during pressurization. Rollout of the base bottle leads to what may be called a "rocker bottom." Preventing rollout of the base helps the bottle stay level when resting on a surface and maintains the flat feet as the contact points on the surface. Further, base rollout can also occur without pressurization or low pressurization of the bottle, such as, for example, during shipping and handling or filling at high speed. A strap base rib also helps prevent base rollout without or low internal pressurization. While the specification herein may discuss preventing or inhibiting deformation under external/internal pressures and/or forces, it is to be understood that some deformation of a bottle may occur without straying outside of the scope of this disclosure. Some deformation of the bottle under external/internal pressures and/or forces may occur while retaining excellent structural properties of the features and functions disclosed herein.

Embodiments disclosed herein can be utilized for bottle pressures of a wide range. The strap base rib can help resist pressurization pressures in the bottle of up to 3 bars, including up to 2.5, up to 2, up to 1.5, up to 1, up to 0.5 bars, and up to 0.3 bars, including ranges bordered and including the foregoing values. The preform design also plays a role in resisting pressures such that much higher pressures than already demonstrated can be resisted with greater strap thickness available from the preform. The strap design provides a more efficient way of resisting the pressure in a bottle that also performs well without pressure.

Embodiments disclosed herein can be utilized in bottle volumes of a wide range. For example, features and functions disclosed herein can be utilized with a 3 ounce bottle up to a multiple gallon bottle. As another example, features and functions disclosed herein can be utilized with an 8 ounce (0.24 liter/0.15 liter) bottle up to a 3 liter bottle, including 12 ounces (0.35 liters) to 2 liters, 16 (0.47 liters) ounces to 1 liter, 18 ounces (0.53 liters) to 0.75 liters, and 0.5 liters, including ranges bordered and including the foregoing values.

In some embodiments, a container comprising a flat foot base having strap ribs and a sidewall having recessed columns, the strap ribs and recessed columns vertically lined up to resist deformation in the base and the sidewall, the container can can comprise one or more of the following: a flat foot base comprising a gate, a wall, and flat feet, the gate centered on a central axis of the container, the wall extending from the gate toward a resting surface of the container, the flat feet extending from the wall to the resting surface; a sidewall connected to the base, the sidewall extending substantially along the central axis to define at least part of an interior of the container; a bell connected to the sidewall and leading upward and radially inward to a finish connected to the bell; a plurality of strap ribs positioned in the base between the flat feet, the strap ribs extending radially outward from at least one of the gate or the wall toward the sidewall, the strap ribs sloping upward relative to the resting surface toward the sidewall from the at least one of the gate or the wall to resist deformation of the base; a plurality of recessed columns positioned in the sidewall, the recessed columns comprising sidewall ribs extending along a periphery of the sidewall and centered about the central axis, wherein portions of the sidewall between the sidewall ribs are substantially continuous along the periphery of the sidewall, the recessed columns configured to resist at least one of bending, leaning, crumbling, or stretching along the sidewall; and/or wherein the strap ribs and the recessed columns vertically line up along the central axis to form pressure resistance bands such that each pressure resistance band comprises a strap rib vertically lined up along the central axis with a recessed column, the pressure resistance bands configured to communicate forces on the container vertically along the container between the base and the sidewall to continuously resist deformation in the base and the sidewall.

In some embodiments, the strap ribs extend radially outward from the wall of the base; the strap ribs extend radially outward from the gate of the base; the wall of the base comprises a dome extending from the gate toward the resting surface of the container without contacting the resting surface, the dome surrounding the gate about the central axis; at least one of the strap ribs extends radially outward from the dome of the base; the base further comprises a plurality of load ribs positioned between the strap ribs, the load ribs having a depth toward the interior of the container shallower than a depth of the strap ribs, the load ribs configured to resist deformation of the base when external forces are applied to the container; the sidewall comprises a base rib positioned along the periphery of the sidewall at a point of contact for the container with other containers when the container and the other containers are packaged together with central axes of the containers being vertical, the base rib centered about the central axis of the container; the sidewall comprises a base rib positioned along the periphery of the sidewall at a point of contact for the container with other containers when the container and the other containers are packaged together with central axes of the containers being vertical, the base rib centered about the central axis of the container; the strap ribs extend through the base rib substantially up to the recessed columns such that the pressure resistance band is continuous through the base rip, the strap ribs forming discontinuities in the base rib; the sidewall ribs comprise a plurality of varying depth ribs positioned along the periphery of the sidewall, wherein each varying depth rib comprises shallow sections and deep sections, the shallow sections having a rib depth less than a rib depth of the deep sections, wherein the shallow sections of the plurality of varying depth ribs vertically line up along the central axis to form the recessed columns; the shallow sections have a rib depth of substantially zero from the periphery of the sidewall; the sidewall is substantially round about the periphery of the sidewall, and wherein the plurality of recessed columns comprises three recessed columns positioned in the sidewall equidistantly around the periphery of the round sidewall; the sidewall comprises a grip portion and a label portion, and wherein the three recessed columns are positioned in the grip portion, and the plurality of recessed columns further comprises six recessed columns positioned in the label portion equidistantly around the periphery of the round sidewall, the six recess columns in the label portion configured to inhibit triangulation of the container, wherein three of the six recess columns in the label portion and the three recessed columns in the grip portion vertically line along the central axis; the plurality of strap ribs comprises three strap ribs positioned in the base equidistantly from each other, and wherein the three strap ribs and the three recessed columns vertically line up along the central axis; the plurality of strap ribs comprises six strap ribs positioned in the base equidistantly from each other, three of the six strap ribs and the three recessed columns vertically lined up along the central axis, and wherein the six strap ribs are configured to inhibit triangulation of the container; the sidewall is substantially square about the periphery of the sidewall, and wherein the plurality of recessed columns comprises four recessed columns positioned in the sidewall equidistantly around the periphery of the square sidewall such that each pressure resistance band further comprises an other strap rib radially extending 180 degrees opposite the strap rib, the other strap rib vertically lined up along the central axis with an other recessed column; the square sidewall comprises corners and flat portions between the corners, and wherein the strap ribs extend toward the flat portions of the square sidewall, the strap ribs configured to resist rounding of the square sidewall at the flat portions; and/or the sidewall ribs comprise a plurality of varying depth ribs positioned along the periphery of the sidewall, wherein each varying depth rib comprises shallow sections and deep sections, the shallow sections having a rib depth less than a rib depth of the deep sections, wherein the shallow sections of the plurality of varying depth ribs vertically line up along the central axis to form the recessed columns, and wherein the deep sections are positioned at the four corners of the square sidewall, the deep sections configured to resist rounding of the square sidewall at the flat portions.

In some embodiments, a container comprising a flat foot base having strap ribs and a sidewall having recessed columns, the strap ribs and recessed columns vertically lined up to resist deformation in the base and the sidewall, the container can comprise one or more of the following: a flat foot base comprising a gate, a dome, and flat feet, the gate centered on a central axis of the container, the dome extending from the gate toward a resting surface of the container without contacting the resting surface, the dome surrounding the gate about the central axis, the flat feet extending from the dome to the resting surface; a sidewall connected to the base, the sidewall extending substantially along the central axis to define at least part of an interior of the container; a bell connected to the sidewall and leading upward and radially inward to a finish connected to the bell; a plurality of strap ribs positioned in the base between the flat feet, the strap ribs extending radially outward from at least one of the gate or the dome toward the sidewall, the strap rib sloping upward relative to the resting surface toward the sidewall from the at least one of the gate or the dome to resist deformation of the base; a plurality of recessed columns positioned in the sidewall, the recessed columns comprising sidewall ribs extending along a periphery of the sidewall and centered about the central axis, wherein portions of the sidewall between the sidewall ribs are substantially continuous along the periphery of the sidewall, the recessed columns configured to resist at least one of bending, leaning, crumbling, or stretching along the sidewall; and/or wherein the strap ribs and the recessed columns vertically line up along the central axis to form pressure resistance bands such that each pressure resistance band comprises a strap rib vertically lined up along the central axis with a recessed column, the pressure resistance bands configured to communicate forces on the container vertically along the container between the base and the sidewall to continuously resist deformation in the base and the sidewall.

In some embodiments, the strap ribs extend radially outward from the gate of the base; the strap ribs extend radially outward from the dome of the base; the base further comprises a plurality of load ribs positioned between the strap ribs, the load ribs having a depth toward the interior of the container shallower than a depth of the strap ribs, the load ribs configured to resist deformation of the base when external forces are applied to the container; the load ribs extend radially outward from at least one of the gate or the dome; the sidewall comprises a base rib positioned along the periphery of the sidewall at a point of contact for the container with other containers when the container and the other containers are packaged together with central axes of the containers being vertical, the base rib centered about the central axis, wherein the strap ribs extend substantially up to the base rib in the sidewall, and the base rib continuously extends along the periphery of the sidewall to resist deformation of the container at the point of contact; the sidewall ribs comprise a plurality of varying depth ribs positioned along the periphery of the sidewall, wherein each varying depth rib comprises shallow sections and deep sections, the shallow sections having a rib depth less than a rib depth of the deep sections, wherein the shallow sections of the plurality of varying depth ribs vertically line up along the central axis to form the recessed columns; the shallow sections have a rib depth of substantially zero from the periphery of the sidewall; the sidewall is substantially round about the periphery of the sidewall, and wherein the plurality of recessed columns comprises three recessed columns positioned in the sidewall equidistantly around the periphery of the round sidewall; the plurality of strap ribs comprises three strap ribs positioned in the base equidistantly from each other, and wherein the three strap ribs and the three recessed columns vertically line up along the central axis; the plurality of strap ribs comprises six strap ribs positioned in the base equidistantly from each other, three of the six strap ribs vertically lined up along the central axis with the three recessed columns such that each pressure resistance band further comprises an other strap rib radially extending 180 degrees opposite the strap rib, and wherein the six strap ribs are configured to inhibit triangulation of the container; the sidewall is substantially square about the periphery of the sidewall, and wherein the plurality of recessed columns comprises four recessed columns positioned in the sidewall equidistantly around the periphery of the square sidewall such that each pressure resistance band further comprises an other strap rib radially extending 180 degrees opposite the strap rib, the other strap rib vertically lined up along the central axis with an other recessed column; the square sidewall comprises corners and flat portions between the corners, and wherein the strap ribs extend toward the flat portions of the square sidewall, the strap ribs configured to resist rounding of the square sidewall at the flat portions; and/or the sidewall ribs comprise a plurality of varying depth ribs positioned along the periphery of the sidewall, wherein each varying depth rib comprises shallow sections and deep sections, the shallow sections having a rib depth less than a rib depth of the deep sections, wherein the shallow sections of the plurality of varying depth ribs vertically line up along the central axis to form the recessed columns, and wherein the deep sections are positioned at the four corners of the square sidewall, the deep sections configured to resist rounding of the square sidewall at the flat portions.

In some embodiments, a container comprises a base. The container can further comprise a grip portion connected to the base through a constant depth base rib and defining a grip portion perimeter that is substantially perpendicular to a central axis. The container can further comprise a label panel portion connected to the grip portion and defining a label portion perimeter that is substantially perpendicular to the central axis. The container can further comprise a bell with an obtuse angle as measured from the central axis to a wall of the bell of at least 120 degrees, the bell connected to the label panel portion through a shoulder and leading upward and radially inward to a finish connected to the bell, the finish adapted to receive a closure. The container can further comprise a plurality of angulating and varying depth ribs positioned substantially along the perimeter of the grip portion wherein each angulating and varying depth rib comprises a plurality of shallow sections, a plurality of middle sections, and a plurality of deep sections. The container can further comprise a plurality of constant depth ribs positioned substantially along the perimeter of the label portion. The shallow sections can have a rib depth less than a rib depth of the middle sections. The deep sections can have a rib depth greater than the rib depth of the middle sections. The shallow sections of the varying depth ribs can substantially vertically line up along the central axis and form recessed columns. The recessed columns can be configured to resist at least one of bending, leaning, or crumbling, or stretching. The plurality of deep sections can be configured to provide hoop strength.

In some embodiments, a container comprises a base. The container can further comprise a grip portion connected to the base through a constant depth base rib and defining a grip portion perimeter that is substantially perpendicular to a central axis. The container can further comprise a label panel portion connected to the grip portion and defining a label portion perimeter that is substantially perpendicular to the central axis. The container can further comprise a bell with an obtuse angle as measured from the central axis to a wall of the bell of at least 120 degrees, the bell connected to the label panel portion through a shoulder and leading upward and radially inward to a finish connected to the bell, the finish adapted to receive a closure. The container can further comprise a plurality of angulating and varying depth ribs positioned substantially along the perimeter of the grip portion wherein each angulating and varying depth rib comprises a plurality of shallow sections, a plurality of middle sections, and a plurality of deep sections. The container can further comprise a plurality of varying depth ribs positioned substantially along the perimeter of the label portion wherein each varying depth rib comprises a plurality of shallow sections, a plurality of middle sections, and a plurality of deep sections. The shallow sections of the angulating and varying depth ribs can have a rib depth less than a rib depth of the middle sections of the angulating and varying depth ribs. The deep sections of the angulating and varying depth ribs can have a rib depth greater than the rib depth of the middle sections of the angulating and varying depth ribs. The shallow sections of the varying depth ribs can have a rib depth less than a rib depth of the middle sections of the varying depth ribs. The deep sections of the varying depth ribs can have a rib depth greater than the rib depth of the middle sections of the varying depth ribs. The shallow sections of the angulating and varying depth ribs can substantially vertically line up along the central axis and form a first plurality of recessed columns. The shallow sections of the varying depth ribs can substantially vertically line up along the central axis and form a second plurality of recessed columns. The first and second plurality of recessed columns can be configured to resist at least one of bending, leaning, crumbling, or stretching. The plurality of deep sections can be configured to provide hoop strength.

In some embodiments, the first plurality of recessed columns substantially vertically line up along the central axis with the second plurality of recessed columns. In some embodiments, the varying depth ribs of the label portion angulate.

In some embodiments, a container comprises a base. The container can further comprise a sidewall connected to the base, the sidewall defining a sidewall perimeter that is substantially perpendicular to a central axis and extending substantially along the central axis to define at least part of an interior of the container. The container can further comprise a bell connected to the sidewall and leading upward and radially inward to a finish connected to the bell, the finish adapted to receive a closure. The container can further comprise a varying depth rib positioned substantially along the sidewall perimeter wherein the varying depth rib comprises a shallow section, a middle section, and a deep section. The shallow section can have a rib depth less than a rib depth the middle section. The deep section can have a rib depth greater than the rib depth of the middle section. The shallow section of the rib can be configured to resist at least one of bending, leaning, or crumbling, or stretching. The deep section can be configured to provide hoop strength.

In some embodiments, the varying depth rib transitions from the shallow section to the middle section to the deep section as at least one of a gradual transition or an abrupt transition. In some embodiments, the varying depth rib has a shape of at least one of trapezoidal, triangular, rounded, squared, oval, or hemispherical. In some embodiments, the varying depth rib angulates around the sidewall perimeter. In some embodiments, the varying depth rib has a plurality of shallow sections, a plurality of middle sections, and a plurality of deep sections. In some embodiments, the contain further comprises a plurality of varying depth ribs wherein at least two shallow sections substantially vertically line up along the central axis and form a recessed column whereby the recessed column is configured to resist at least one of bending, leaning, or crumbling, or stretching. In some embodiments, the plurality varying depth ribs have a plurality of shallow sections, a plurality of middle sections, and a plurality of deep sections. In some embodiments, the container further comprises a rib of a constant depth. In some embodiments, the bell has an obtuse angle as measured from the central axis to a wall of the bell of at least 120 degrees.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter discussed herein will become apparent in the teachings set forth herein. The summary is provided to introduce a selection of concepts in a simplified form that are further described below in the Detailed Description. This summary is not intended to identify key features or essential features of any subject matter discussed herein.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

DETAILED DESCRIPTION

Figure 1:
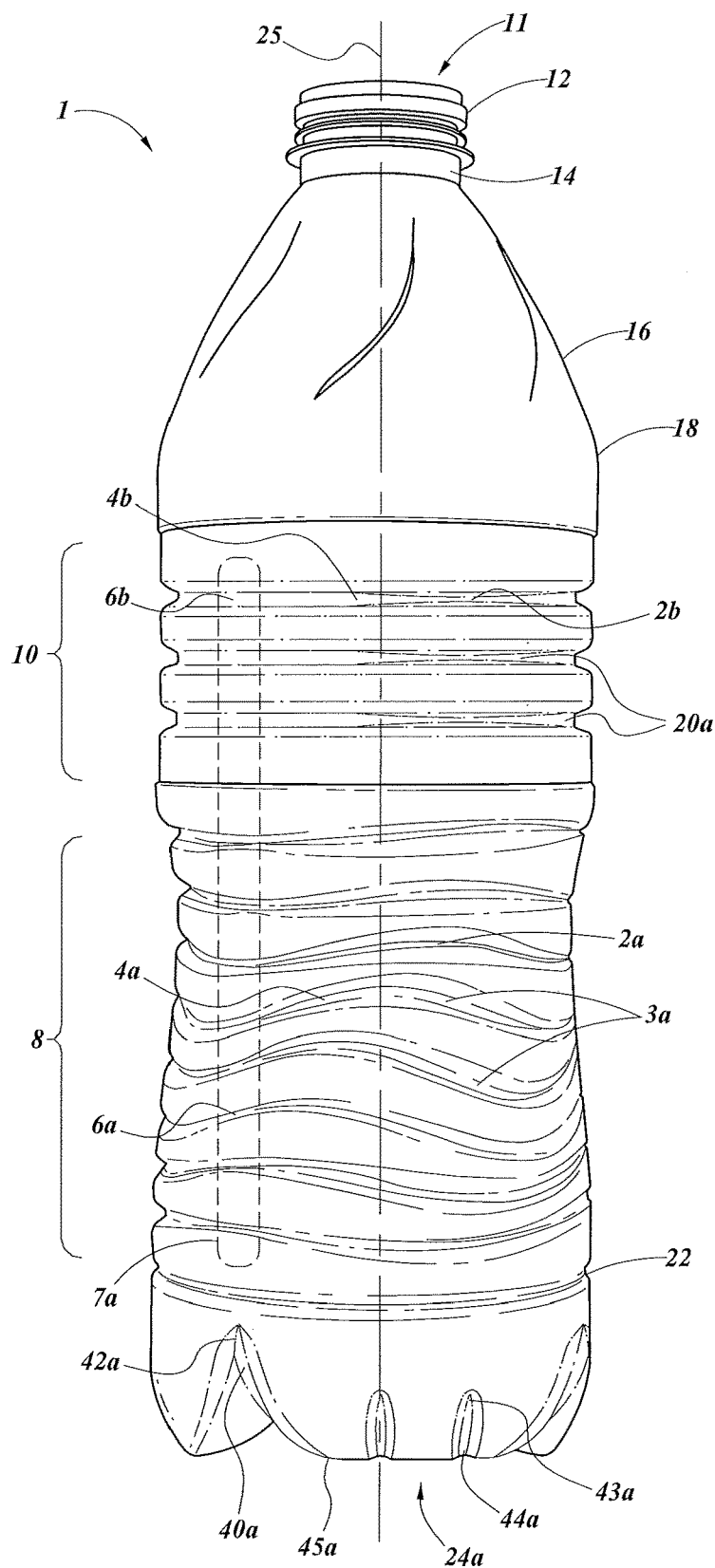
FIG. 1 illustrates a side view of an embodiment of a bottle.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally discussed herein, and illustrated in the Figures, may be arranged, substituted, combined, and designed in a wide variety of different configurations, all of which are explicitly contemplated and made part of this disclosure.

In particular, disclosed herein are articles, including preforms and containers, which utilize less plastic in their construction while maintaining or surpassing the ease of processing and excellent structural properties associated with current commercial designs.

FIG. 1 illustrates a side view of an embodiment of the bottle 1. The bottle 1 has a base 24a that extends up into a base rib 22. Connected to the base 24a, the grip portion 8 comprises a plurality of grip portion ribs 3a (i.e., sidewall ribs). As illustrated in FIG. 1, grip portion ribs 3a (positioned in the grip portion 8) may vary in depth by separating or transitioning the rib from a deep rib 2a to a flattened and/or shallow rib 6a to be discussed in further detail below. In the illustrated embodiment, the grip portion ribs 3a swirl or angulate around the grip portion 8.

Referring to FIG. 1, a label portion 10 is connected to the grip portion 8 and comprises one or more label panel ribs 20a (i.e., sidewall ribs). The label panel portion 10 transitions into a shoulder 18, which connects to a bell 16. The bell 16 may include scallops (including as illustrated) or other design features or it may be smooth and generally unornamented. The bell 16 connects to a neck 14, which connects to a finish 12. From the label portion 10, the bell 16 leads upward and radially inward, relative to a central axis 25, to the neck 14 and finish 12. The finish 12 can be adapted to receive a closure to seal contents in the bottle 1. The finish 12 defines an opening 11 that leads to an interior of the bottle 1 for containing a beverage and/or other contents. The interior can be defined as at least one of the finish 12, the neck 14, the bell 16, the shoulder 18, the label portion 10, the grip portion 8, or the base 24a.

A substantially vertical wall comprising the grip portion 8 and label portion 10 between the base 24a and bell 16, extending substantially along the central axis 25 to define at least part of the interior of the bottle 1, can be considered a sidewall of the bottle 1. In some embodiments, the sidewall may include the bell 16, shoulder 18, and/or base 24a. The perimeter (i.e., periphery) of the sidewall is substantially perpendicular to the central axis 25 of the interior. The sidewall defines at least part of the interior of the bottle 1. The finish 12, the neck 14, the bell 16, the shoulder 18, the label portion 10, the grip portion 8, and the base 24a can each define a respective perimeter or circumference (i.e., periphery) (substantially perpendicular to the central axis 25) corresponding to that portion. For example, the label portion 10 has a label portion perimeter. As another example, the grip portion 8 has a grip portion perimeter.

In the embodiment illustrated in FIG. 1, each of the grip portion ribs 3a comprises a deep rib 2a section transitioning to a middle section 4a then to a flattened and/or shallow rib 6a sections. As FIG. 1 illustrates, each of the label panel ribs 20a may comprise a deep rib 2b section transitioning to a middle section 4b then to a flattened and/or shallow rib 6b sections. The deep, middle, and shallow rib sections may also be called deep, middle, and shallow ribs as shorthand, but it is to be understood that these terms are meant to define sections of a rib in the grip portion 8, label portion 10, and base rib 22. A varying depth grip portion rib 3a transitions from a deep rib 2a section to a middle rib/section 4a then to a flattened and/or shallow rib 6a section. A varying depth label panel rib 20a transitions from a deep rib 2b to a middle rib/section 4b then to a flattened and/or shallow rib 6b. The one or more flattened and/or shallow ribs 6a,b form an equivalent of recessed columns 7a at portions where a plurality flattened and/or shallow ribs 6a,b substantially vertically line up along the vertical or central axis 25 of the bottle 1 as illustrated in FIG. 1. A plurality of deep ribs 2a,b substantially vertically line up along the vertical or central axis 25 of the bottle 1 as illustrated in FIG. 1.

In some embodiments, the flattened and/or shallow ribs 6b of the label panel ribs 20a are vertically misaligned with the flattened and/or shallow ribs 6a of the grip portion ribs 3a such that the label portion 10 has a set of recessed columns and the grip portion 8 has another set of recessed columns. Thus, the recessed column of the label portion 10 can be vertically misaligned from the recessed columns of the grip portion 8. In some embodiments, the bottle 1 can have recessed columns in just the grip portion 8 or just the label panel portion 10.

In the illustrated embodiments with three lined-up flattened and/or shallow ribs 6a,b, the bottle respectively has three recessed columns 7a. The three recessed columns 7a may be equally spaced apart around the circumference of the bottle 1 and located on the opposite side of the bottle circumference from the deep rib 2a,b portions. With three equally spaced recessed columns 7a, the recessed columns 7a are spaced every 120 degrees around the bottle 1 circumference. Any number of recessed columns 7a may be incorporated into a design of the bottle 1 by increasing or decreasing the number of flattened and/or shallow ribs 6a,b that substantially vertically line up along the vertical or central axis 25. For instance, the bottle may have as few as 1 or up to 10 recessed columns 7a, including 2, 3, 4, 5, 6, 7, 8, or 9 recessed columns 7a, including ranges bordered and including the foregoing values. The collections of flattened and/or shallow ribs 6a,b that form recessed columns 7a provide resistance to leaning, load crushing, and/or stretching. Leaning can occur when during and/or after bottle packaging, a bottle experiences top load forces (tangential forces or otherwise) from other bottles and/or other objects stacked on top of the bottle. Similarly, top load crushing can occur due to vertical compression (or otherwise) forces from bottles and/or other objects stacked on top. Stretching can occur when a bottle is pressurized. The recessed columns 7a transfer the resulting forces along the wall to the base 24a and increase bottle 1 rigidity. Deep ribs 2a,b of the grip portion ribs 3a and label panel ribs 20a provide the hoop strength that can be equivalent to the hoop strength of normal or non-varying depth ribs. The number of ribs, including base ribs 22, grip portion ribs 3a, and/or label panel ribs 20a may vary from 1 to 30 ribs every 10 centimeters of any rib containing portion of the bottle, such as, but not limited to the grip portion 8 and/or label panel portion 10, including 1, 2, 3, 4, 5, 6, 7, 8, 9, 10, 11, 12, 13, 14, 15, 16, 17, 18, 19, 20, 21, 22, 23, 24, 25, 26, 27, 28, or 29 ribs every 10 centimeters, including ranges bordered and including the foregoing values. The aforementioned 10 centimeter section that is used to measure the number of ribs need not be actually 10 centimeters in length. Rather, 10 centimeters is used illustratively to provide a ratio for the number of ribs.

While discussed above in reference to FIG. 1, as will be apparent, recessed column features, functions, and variations thereof may be applied to any of the embodiments discussed in reference to FIGS. 2-28. For a further discussion of the recessed columns, refer to U.S. Pat. No. 8,556,098, entitled "Plastic Container Having Sidewall Ribs with Varying Depth," the entirety of which is incorporated herein by reference.

With continued reference to FIG. 1, the base 24a has a strap rib 40a. The strap rib 40a has a sidewall end 42a that terminates along the sidewall of the bottle 1 as discussed herein. The base has 24a has a load rib 44a. As illustrated in FIG. 1, the base 24a can have two load ribs 44a between two strap ribs 40a. In some embodiments, the base 24a can have 1, 3, 4, and 5 load ribs 44a between two strap ribs 40a. The load rib 44a has a sidewall end 43a that terminates along the base 24a near or at a transition from the base 24a to the sidewall of the bottle 1. As illustrated in FIG. 1, the sidewall end 43a of the load rib 44a may be vertically lower than the sidewall end 42a of the strap rib 40a along the central axis 25. In some embodiments, the sidewall end 43a of the load rib 44a may terminate along the sidewall of the bottle 1 at a same height as to the sidewall end 42a of the strap rib 40a. The base 24a has feet 45a formed between the strap ribs 40a and the load ribs 44a.

The strap rib 40a is relatively larger and deeper than the load rib 44a as discussed herein. As illustrated in FIG. 1, the strap base rib 40a may vertically align with the recessed columns 7a. Where a bottle 1 has three recessed columns 7a, the base 24a can have three strap ribs 40a. The strap ribs 40a are spaced equally around the circumference of the bottle 1. With three equally spaced strap ribs 40a, the strap ribs 40a are positioned every 120 degrees around the bottle circumference. The load ribs 44a can vertically align with the grip portion rib 3a sections between the recessed columns 7a. In some embodiments, the strap ribs 40a may be vertically misaligned with the recessed columns 7a. In some embodiments, the strap ribs 40a may be spaced unequally around the bottle circumference. In some embodiments, the base 24a may have more or less strap ribs 40a than the number of recessed columns 7a.

Figure 2:
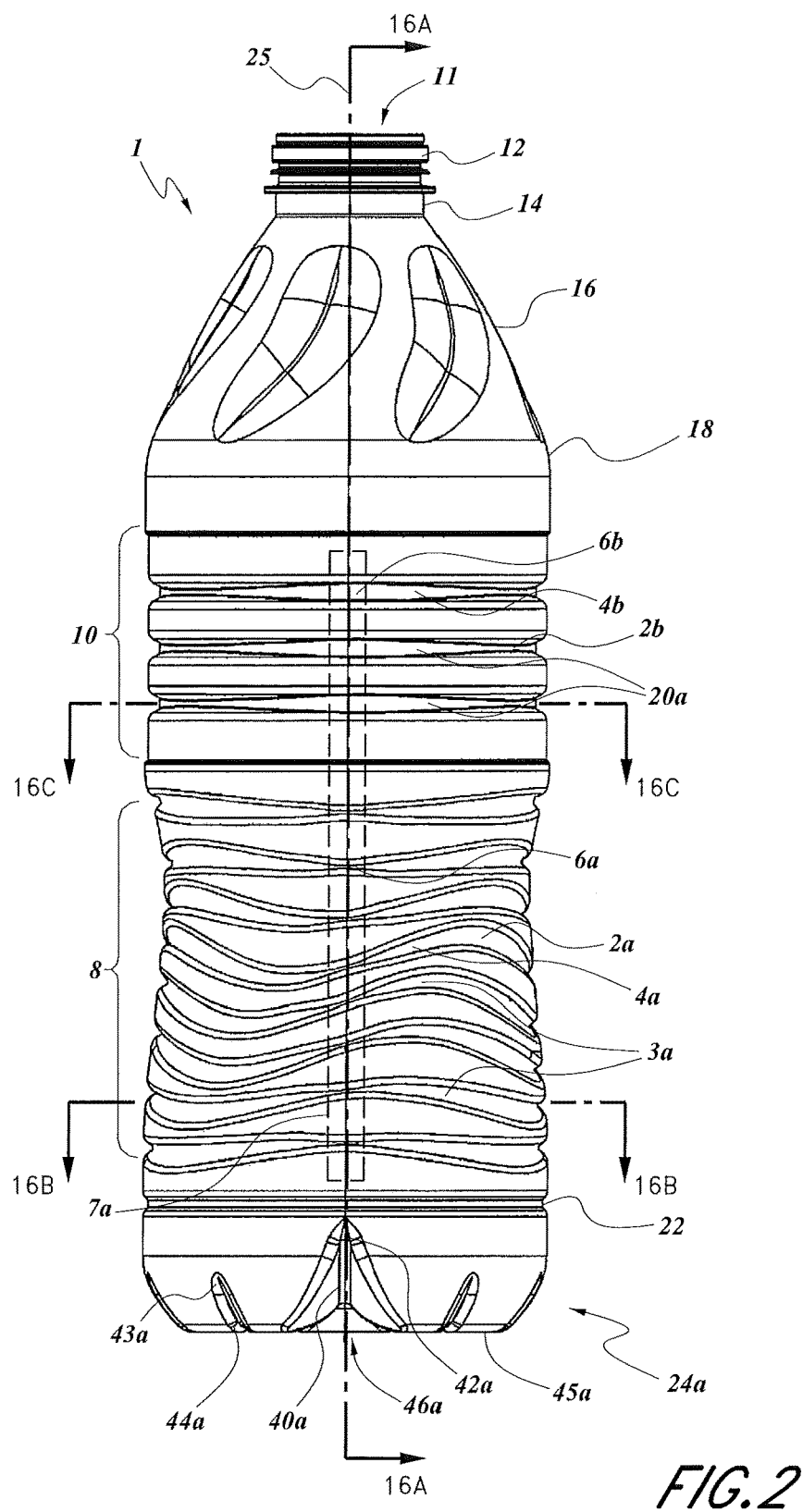
FIG. 2 illustrates a side view of the embodiment shown in FIG. 1 rotated 60 degrees.

FIG. 2 illustrates a side view of the embodiment shown in FIG. 1 rotated 60 degrees. The sidewall end 42a of the strap rib 40a vertically aligns or points to substantially the center of the recessed columns 7a (center point of the shallow and/or flattened ribs 2a,b). As illustrated in FIG. 2, the strap rib 40a forms a recess 46a from a side view perspective. The recess 46a is relatively a small area in comparison to feet 45a contact area with a resting surface. A small recess 46a aids in distributing more resin toward the feet 45a during the blowing process. More resin at the feet 45a increases the abrasion resistance and strength of the feet 45a. Thus, strap ribs 40a can function to provide internal pressure resistance while leaving enough resin for the feet 45a to achieve the benefits of a flat foot base (i.e., thicker resin feet 45a for greater abrasion, deformation, and/or stress resistance; and/or greater foot contact area for stability and load distribution).

The strap rib 40a can extend substantially from a central portion of the base 24a (from the central axis 25) as discussed herein. The strap rib 40a can act as a strap between the recessed columns 7a of the sidewall to the central portion of the base 24a. As shown in FIG. 2, the strap rib 40a provides a more direct and shorter path to the center of the base 24a from the sidewall of the bottle 1 without proceeding to the vertical level of the feet 45a. As discussed herein, the strap rib 40a thus provide relatively more pressure resistant base 24a. The strap rib 40a provides a link for forces and stresses between the sidewall, including the recessed column 7a, and the central portion of the base 24a.

Figure 3:
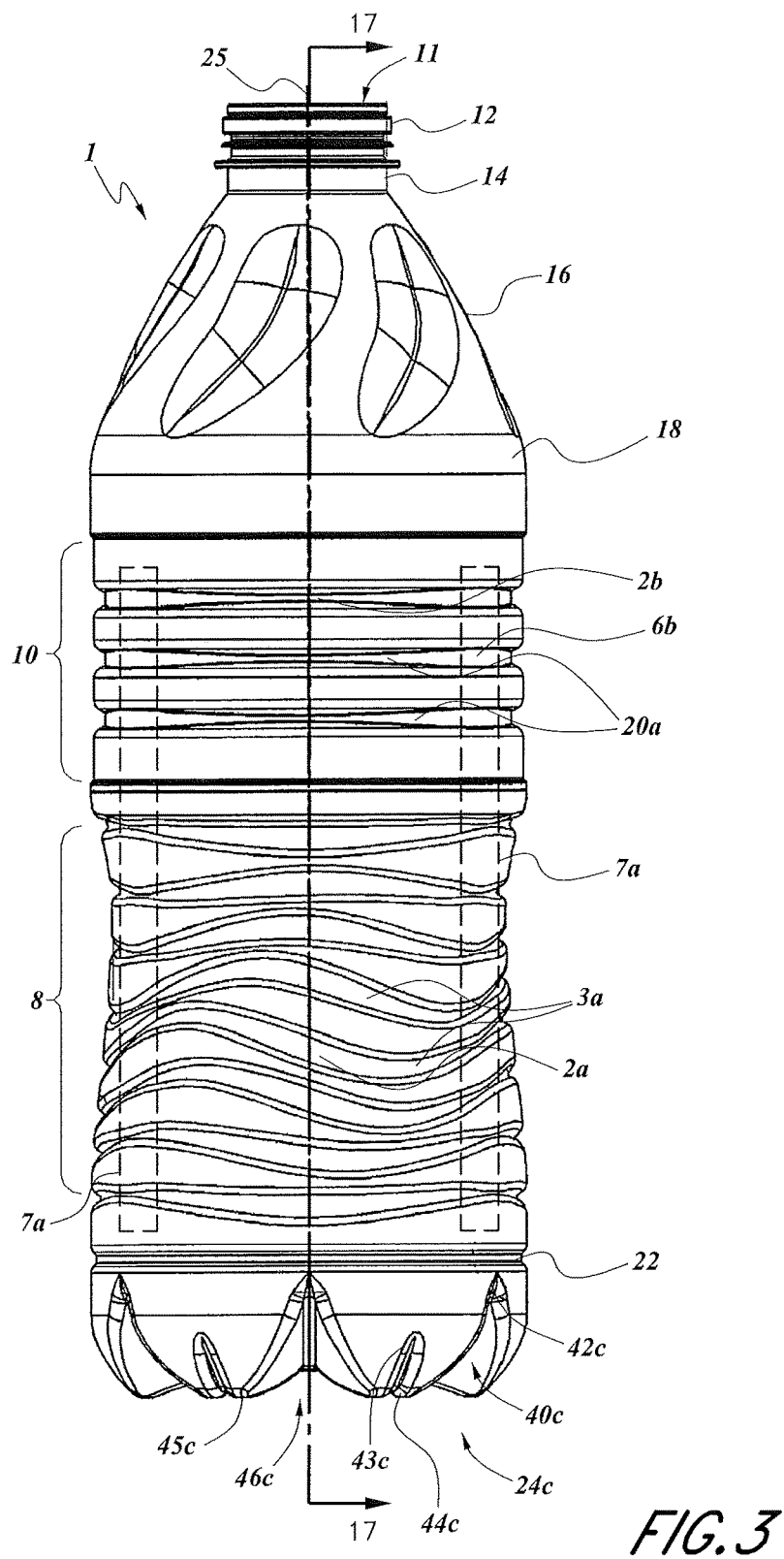
FIG. 3 illustrates a side view of an embodiment of a base having six strap ribs.

FIG. 3 illustrates a side view of an embodiment of a base 24c having six strap ribs 40c. Three strap ribs 40c can vertically align with recessed columns 7a. The other three strap ribs 40c can vertically align along the central axis substantially at the deep ribs 2a,b of the grip portion ribs 3a and the label panel ribs 20a. The strap ribs 40c are equally spaced around the circumference of the bottle 1. With equally spaced strap ribs 40c, the strap ribs 40c are positioned every 60 degrees around the bottle circumference. Under pressure, the deep rib 2a,b sections may flex out, triangulating the bottle 1. Triangulation of the bottle 1 can occur in the grip portion 8 and/or label portion 10. The strap ribs 40a vertically aligned with the deep rib 2a,b sections can at least partially prevent the flexing out of the deep ribs 2a,b. The strap ribs 40a vertically aligned with the deep ribs 2a,b resist outward radial expansion, which in turn can help prevent outward radial expansion at the grip portion 8 and/or the label portion 10. Preventing outward radial expansion at the grip portion 8 and/or the label portion 10 helps prevent triangulation of the bottle 1. Preventing triangulation helps retain bottle roundness for consumer appeal. Further, maintaining bottle roundness aids in ensuring a labeler during the bottling process correctly labels the bottle. The labeler may not be able to properly label a triangulated bottle.

Figure 4:
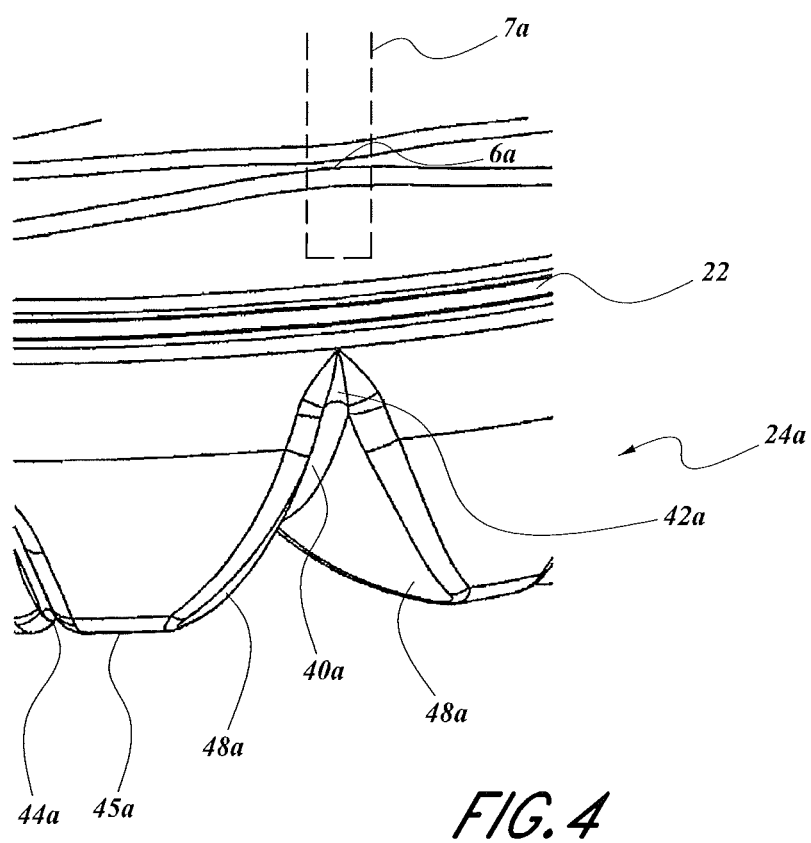
FIG. 4 illustrates a top perspective view of an embodiment of a strap rib.

FIG. 4 illustrates a top perspective view of an embodiment of a strap rib 40a. As shown in FIG. 4, the strap rib 40a has a sidewall end 42a that terminates at substantially the edge or boundary of the base rib 22. The illustrated sidewall end 42a terminating at or near the base rib 22 still allows for the strap rib 40a to communicate with the recessed column 7a through the base rib 22 as discussed herein. By the strap rib 40a not proceeding beyond the base rib 22, the base rib 22 is maintained as an unbroken rib around the perimeter of the bottle 1. As discussed herein, the base rib 22 can act as a contact point with other bottles during packaging, shipping, and/or handling. An unbroken base rib 22 can better resist stresses and deformation placed on the bottle when contacted by or bumped against other bottles or structures. Thus, where retaining contact point integrity is desired, such as for example unpressurized or relatively low pressurized bottle applications, the base rib 22 can remain unbroken with the sidewall end 42a of the strap rib 40a terminating at or near the base rib 22.

Figure 5:
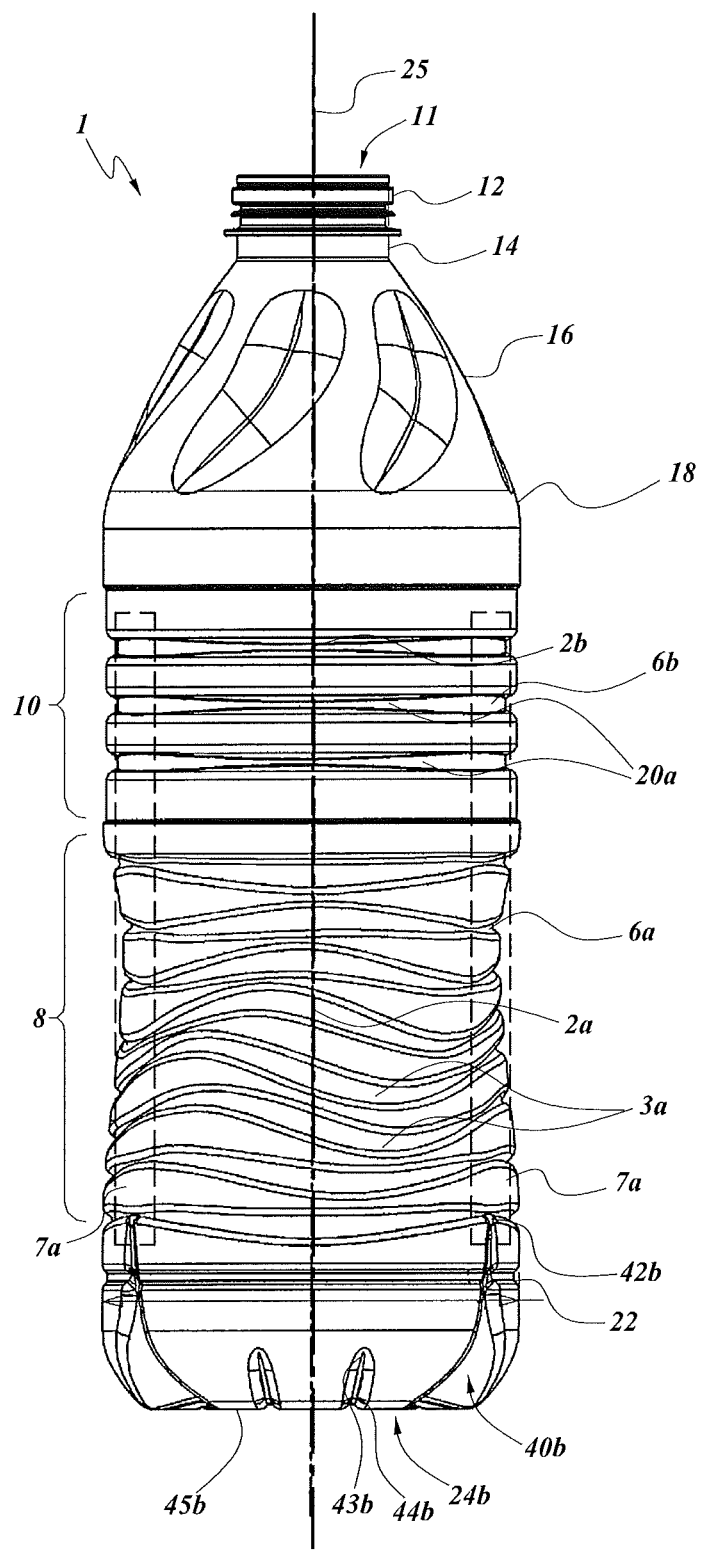
FIG. 5 illustrates a side view of another embodiment of a bottle.

FIG. 5 illustrates a side view of an embodiment of a base 24b with a strap rib 40b leading into the sidewall of the bottle passed the base rib 22. As shown in FIG. 5, the sidewall end 42b of the strap rib 40b may terminate in the grip portion 8, such as at a first flattened and/or shallow rib 6a (first from the base 24b) when the strap rib 40b vertically aligns with the recessed column 7a. In some embodiments, the strap rib 40b may vertically align with the deep ribs 2a,b and may terminate into a first deep rib 2a (first from the base 24b). In some embodiments, the strap rib 40b may have a sidewall end 42a that terminates past the first shallow rib 6a and/or the first deep rib 2a, such as for example at the second, third, and/or third fourth grip portion ribs 3a.

Figure 6:
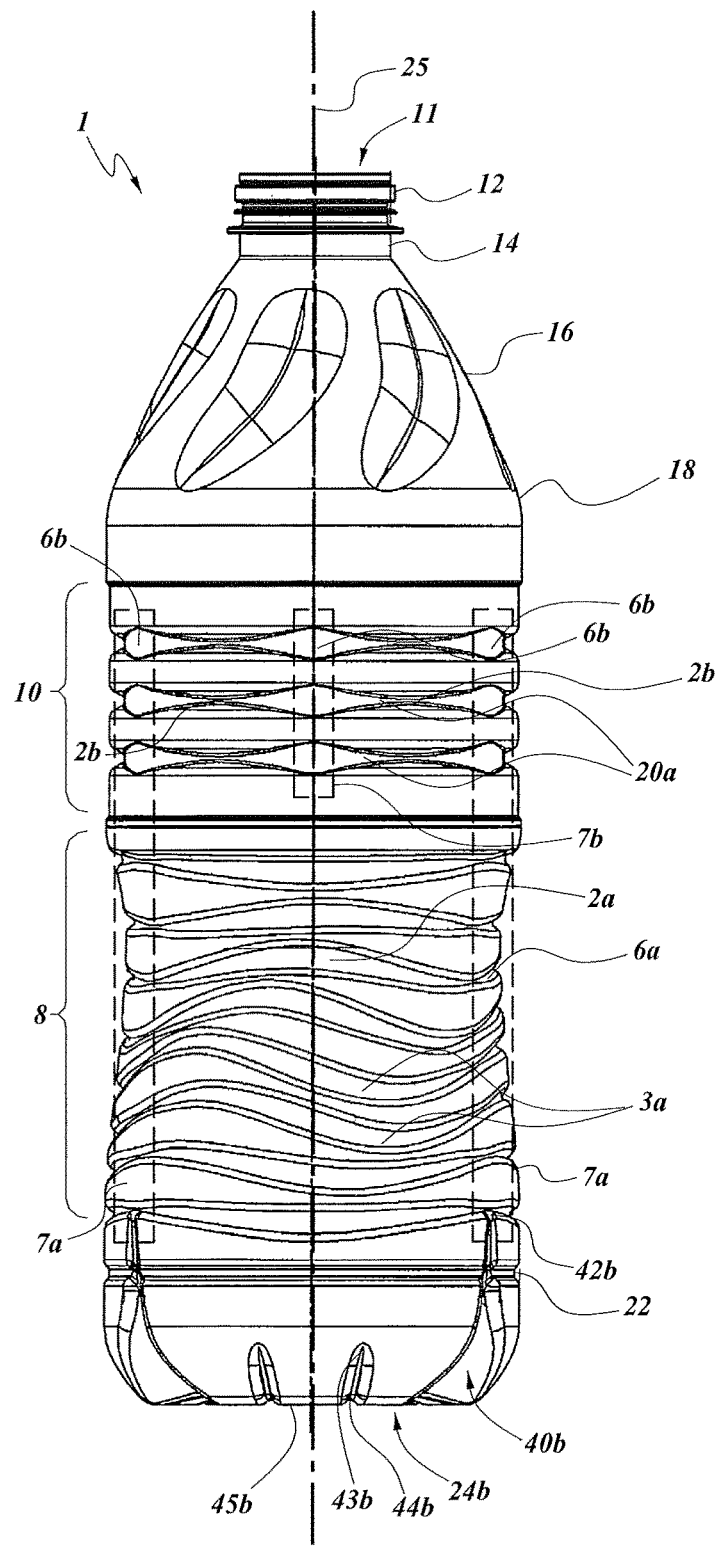
FIG. 6 illustrates a side view of an embodiment of a bottle with six recessed columns in a label portion.

FIG. 6 illustrates a side view of an embodiment of a label portion 10 with six recessed columns 7b. As shown in FIG. 6, the label portion 10 may have six shallow ribs 6b that align vertically. Each vertical alignment of the shallow ribs 6b forms a recessed column 7b. The recessed columns 7b are equally spaced around the circumference of the bottle 1. With six equally spaced recessed columns 7b around the bottle circumference, the recessed column 7b are positioned every 60 degrees around the bottle circumference. More recessed columns 7b can help prevent triangulation of the bottle 1, including in the label portion 10, as discussed herein. Shallow ribs 6a,b and/or recessed columns 7a,b better resist radially outward flexing, at least partially because shallower ribs have less radial depth to provide a range for flexing. Correspondingly, shallow ribs 6a,b and/or recessed columns 7a,b have better resistance to internal pressure relative to the deep ribs 2a,b. Thus, more frequent shallow ribs 6a,b and/or recessed columns 7a,b around the bottle circumference helps inhibit triangulation of the bottle 1. In some embodiments, the six recessed column 7b may be combined with embodiments illustrated in FIG. 3 with six strap ribs 40c. Accordingly, such embodiments may better resist triangulation in both label portion 10 and the grip portion 8 as discussed herein. As shown in FIG. 6, having three recessed columns 7a in the grip portion 8 with six recessed column 7b in the grip portion 10 helps achieve rigidity in the grip portion 8 with the three regions of deep ribs 2a providing hoop strength while avoiding triangulation in the label portion 10 with six recessed columns 7b inhibiting flexing out of the sidewalls, particularly at the label portion 10.

Figure 7:
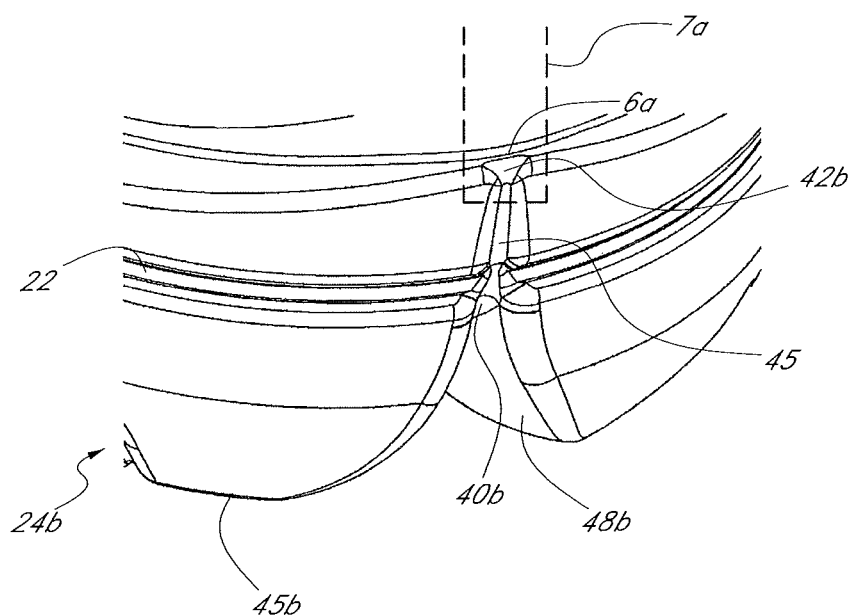
FIG. 7 illustrates a top perspective view of another embodiment of a strap rib.

FIG. 7 illustrates a top perspective view of an embodiment of a strap rib 40b. As shown in FIG. 7, the strap rib 40b has a sidewall end 42b that terminates substantially at or in the first shallow rib 6a (first from the base 24b) via a straight portion 45 as discussed herein, and in particular, as discussed in reference to FIG. 19. A sidewall end 42b that proceeds into the grip portion 8 of the bottle, such as into the grip portion ribs 3a, allows the strap rib 40b to directly connect or communicate with a recessed column 7a. The direct communication of the strap rib 40b and the recessed column 7a can help achieve resistance to internal pressure as discussed herein. The direct communication between the strap rib 40b and the recessed column 7a can help achieve better transfer and resistance to stresses placed on a bottle as discussed herein.

Figures 8A, 8B:
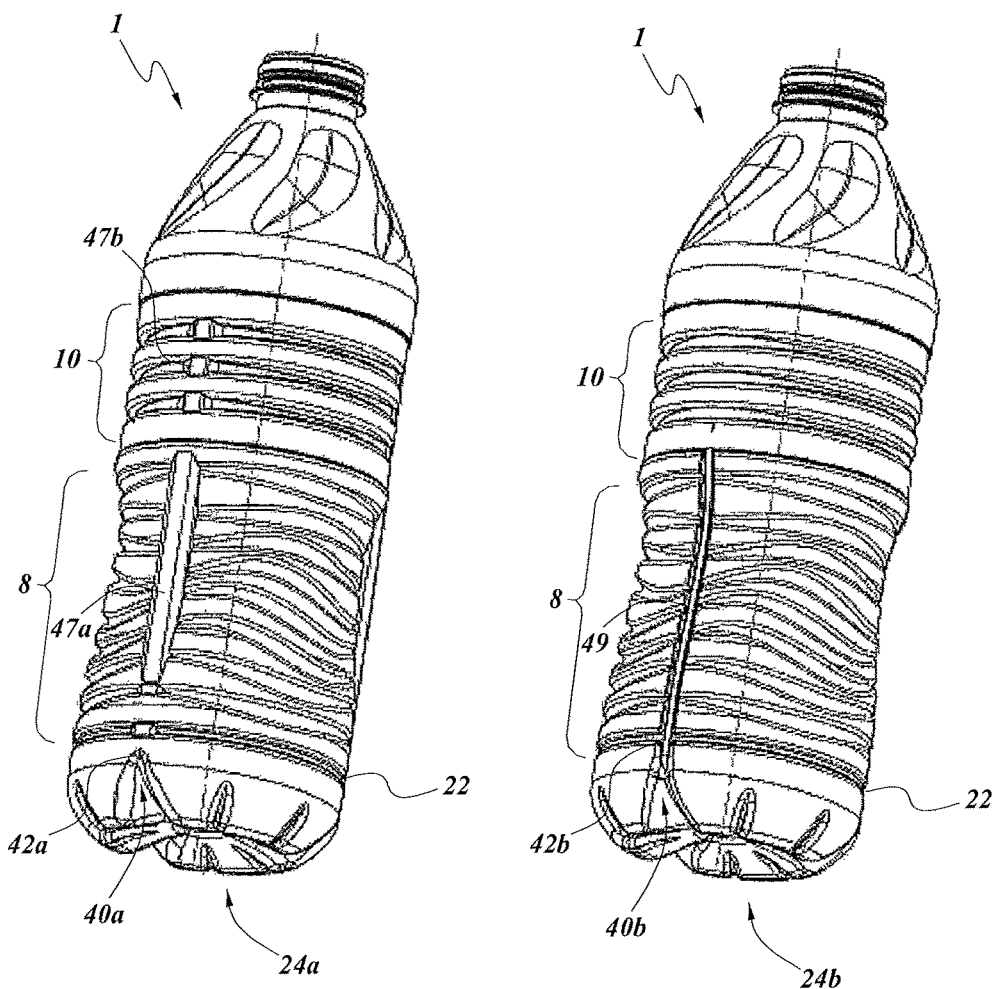
FIGS. 8A and 8B illustrate bottom perspective views of embodiments of bottles with columns in the sidewalls.

FIGS. 8A and 8B illustrate a bottom perspective view of embodiments of the bottle 1 with columns in the sidewalls. As shown in FIG. 8A, the bottle 1 may have a protruding column 47*a,b*. A protruding column may be considered a column that radially protrudes outward from an immediately surrounding surface formed by, for example, the sidewall of the bottle 1. The protruding column has a grip portion 8 (including the base rib 22) protruding column 47*a* and a label portion 10 protruding column 47*b*. The protruding column 47*a,b* can resist bending, leaning, and/or stretching as discussed herein. The protruding column 47*a,b* can also resist radially outward flexing at and near the protruding column 47*a,b*. The protruding column 47*a,b* is formed substantially along the entire length or height of the bottle sidewall without breaking the continuity of other bottle contact points of the bottle as discussed herein, such as, for example, at or near the base rib 22. As shown in FIG. 8A, the base 24*a* has a strap rib 40*a* that substantially vertically aligns with the protruding column 47*a,b*. The alignment of the protruding column 47*a,b* with the strap rib 40*a* achieves substantially the same resistance to bending, leaning, stretching, and/or base rollout as discussed herein in reference to the base rib 40*a* vertically aligning with a recessed column 7*a*.

As shown in FIG. 8B, the bottle 1 may have an indented column 49. An intended column may be considered a column that radially intends inwardly from an immediately surrounding surface formed by, for example, the sidewall of the bottle 1. The intended column 40 is positioned in the grip portion 8 (including the base rib 22). The intended column 49 can resist bending, leaning, and/or stretching as discussed herein. The intended column 49 can also resist radially outward flexing at and near the intended column 49. The intended column 49 can achieve the desired function discussed herein while avoiding protruding from a perimeter of the sidewall of the bottle 1. The intended column 49 can project through, for example, the base rib 22, making the base rib 22 discontinuous. A discontinuous rib 22 can be utilized in pressurized bottle applications where at least some of the contact point resistance as discussed herein is provided due the bottle being pressurized. As shown in FIG. 8A, the base 24*b* has a strap rib 40*b* that substantially vertically aligns with the intended column 49. The strap rib 40*b* transitions into the intended column 49 continuously for potentially better functionality. The strap rib 40*b* can directly communicate with the intended column 49 by the strap rib 40*b* directly transitioning into the intended column 49, through, for example, the base rib 22 as illustrated in FIG. 8B. The alignment and direct communication of the strap rib 40*b* with the intended column 49 helps form a pressure resistance strap as discussed herein, and in particular, in reference to FIGS. 16, 17, and 25. The alignment and direct communication of the intended column 49 with the strap rib 40*b* achieves substantially the same resistance to bending, leaning, stretching, and/or base rollout as discussed herein in reference to the base rib 40*b* vertically aligning with a recessed column 7*a*.

Figure 9:
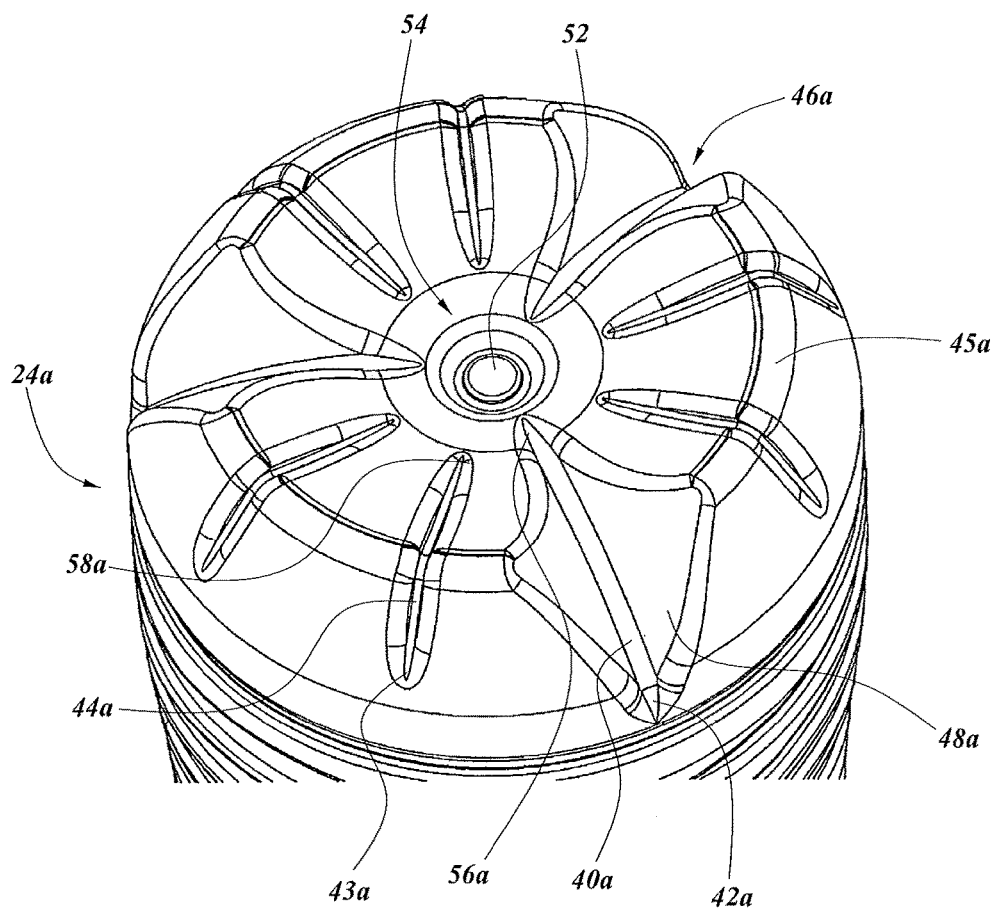
FIG. 9 illustrates a bottom perspective view of an embodiment of a base.

FIG. 9 illustrates a bottom perspective view of an embodiment of the base 24*a*. The base 24*a* has a strap rib 40*a* and a load rib 44*a* as discussed herein. The base 24*a* has a gate 52. As shown in FIG. 9, the base 24*a* may have a dome 54. The dome 54 may be considered the area generally or immediately around the gate 52. The dome 54 may be termed as a push up of the base 24*a*. For example, the dome 54 is a wall of the base 24*a* that slopes more steeply toward a resting surface when the bottle is vertically placed on the resting surface relative to the rest of the wall of the base 24*a* leading to legs the 45*a* of the base 24*a*.

The strap rib 40*a* has a base end 56*a* that terminates near, at, or in the dome 54. In some embodiments, the base end 56*a* for a strap rib 40*a* can be positioned outside of the dome 54 region similarly to base ends 58*a* for load ribs 44*a*. The strap rib 40*a* has a petal wall (i.e., valley wall) 48*a* that connects that strap rib 40*a* to portions of the base 24*a* and the feet 45*a* of the base 24*a*. The petal wall 48*a* smoothly and gradually transitions into the base 24*a* and the feet 45*a*. The smooth and gradual transition provides internal pressure resistance at and near the petal wall 48*a* since more spherical features of the bottle 1 can better accommodate internal pressure. The strap rib 40*a* is relatively deeper in the base 24*a* than the load rib 58*a* to provide stress transfer and pressure resistance as discussed herein.

The load rib 44*a* has a base end 58*a* that terminates at, near, or at the dome 54. As shown in FIG. 9, the base end 58*a* of the load rib 44*a* may terminate before the base end 56*a* of the strap rib 40*a*. The load rib 44*a* is shallow relative to the strap rib 40*a*. As show in FIG. 9, the load rib 44*a* may not have or may have a smaller petal wall 48*a* feature as discussed herein reference to the strap rib 40*a*. The transition from the load rib 44*a* to the base 24*a* and the feet 45*a* is more abrupt or sharper. The sharper transition provides external stress resistance relative to a petal 48*a*. When the bottle 1 is top loaded during packaging, shipping, and/or handling, sharper transitions of the load ribs 44*a* help resist bending and/or leaning as discussed herein by, for example, maintaining the integrity and shape of the base 24*a*.

The sharper transitions provide for faster transitions into the feet 45*a* of the base 24*a*. Faster transitions lead to more area of the base 24*a* being available for relatively larger feet 45*a*. Larger feet 45*a* of a flat foot base 24*a* as discussed herein and as illustrated in FIG. 9 provide more resin contact area with a resting surface. More resin contacting the resting surface provides better abrasion resistance and stability of the base 24*a*.

As shown in FIG. 9, the petal wall 48*a* may transition into the strap rib 40*a* itself more abruptly or sharply relative to the transition from the petal 48*a* to the feet 45*a*. The sharper transitions at the strap rib 40*a* itself may provide more rigidity to the strap rib 40*a* to resist or inhibit flexing due to internal pressures as discussed herein.

Figure 10:
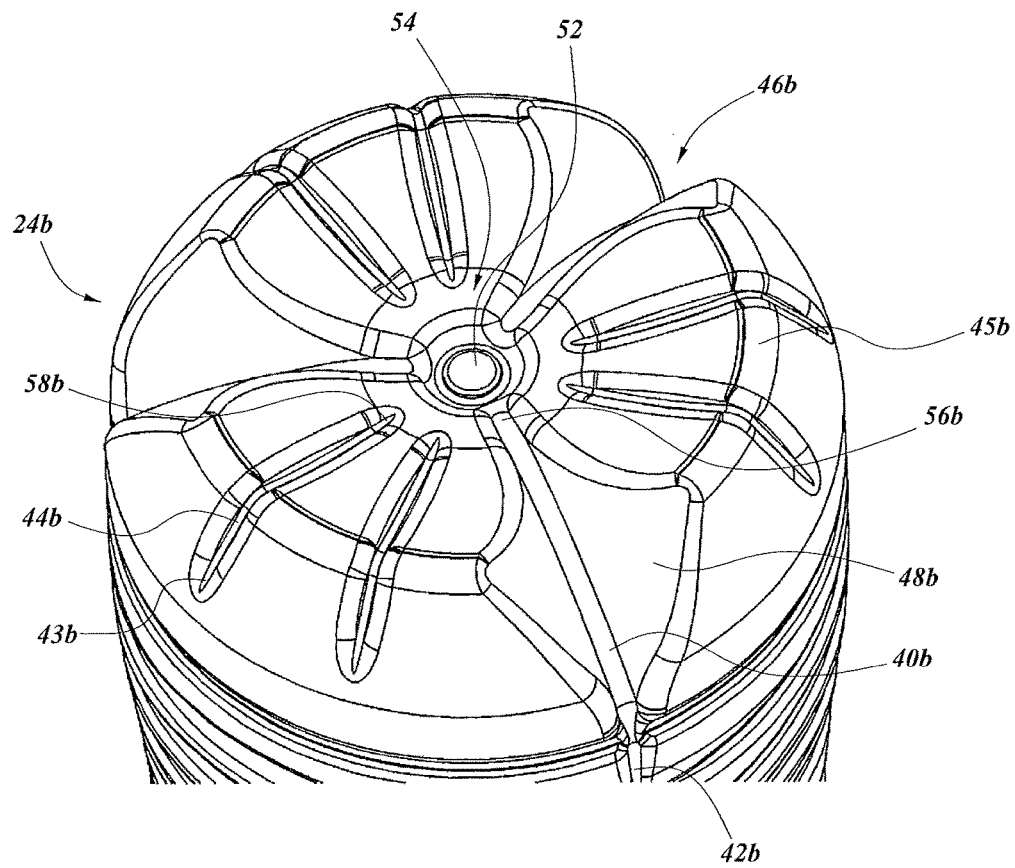
FIG. 10 illustrates a bottom perspective view of another embodiment of a base.

FIG. 10 illustrates a bottom perspective view of an embodiment of the base 24*b*. The base 24*b* has a strap rib 40*b* and a load rib 44*b* as discussed herein. The strap rib 40*b* has a base end 56*b* that terminates near, at, or in the dome 54. As shown in FIG. 10, the base end 56*b* of the strap rib 40*b* may terminate substantially near or at the gate 52. The load rib 44*b* has a base end 58*b* that terminates near, at, or in the dome 54. As shown in FIG. 10, the base end 58*b* of the load rib 44*b* may terminate before the base end 56*b* of the strap rib 40*b*. Terminating the base ends 56*b* of the strap rib 40*b* and/or the base end 58*b* of the load rib 44*b* substantially near or at the gate 52 can provide more internal pressure resistance to the base 24*b* as discussed herein, helping prevent, for example, base 24*b* rollout. Terminating the base ends 56*b* of the strap rib 40*b* substantially near or at the gate 52 provides a strap rib 40*b* that is continuous from (or near) the gate 52 to the sidewall end 42*b*. As shown in FIG. 7 and FIG. 10, the sidewall end 42*b* may terminate at the first shallow rib 6*a* and communicate directly with a recessed column 7*a*. The continuity from the recessed column 7*a* to the gate 52 provides a substantially continuous pressure resistance band or strap from a top of the label portion 10 to the gate 52. A pressure resistance strap 9*a,b* (FIGS. 16 and 17) that is substantially continuous can provide greater resistance to internal pressure as discussed herein.

Figure 11:
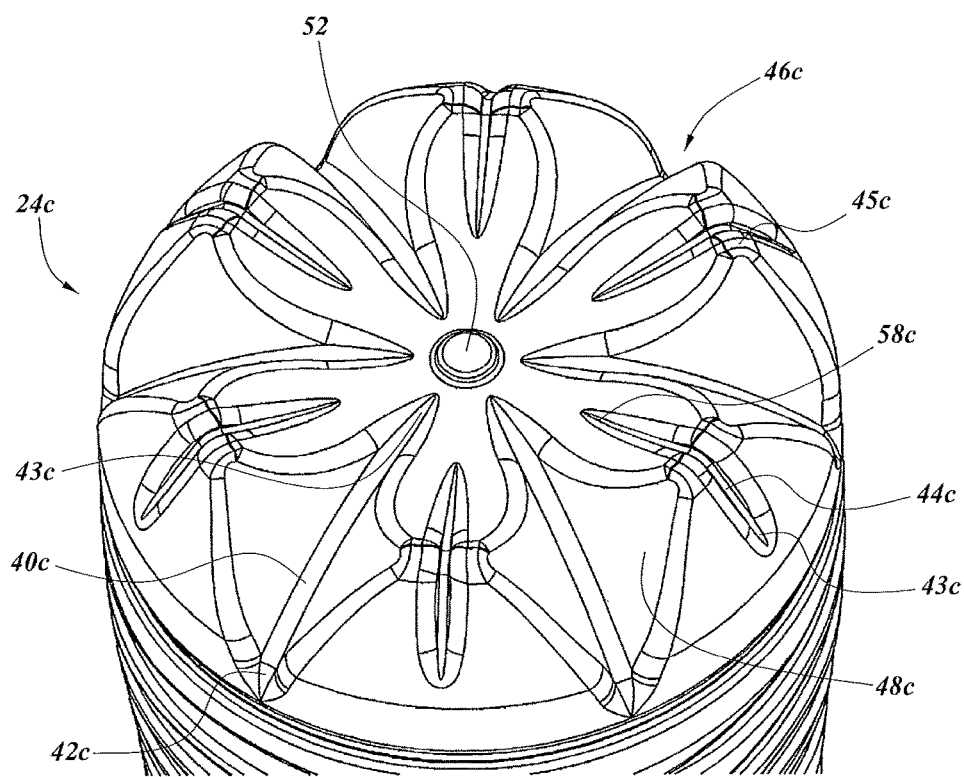
FIG. 11 illustrates a bottom perspective view of another embodiment of a base.

FIG. 11 illustrates a bottom perspective view of an embodiment of the base 24c. The base 24c has a strap rib 40c and a load rib 44c as discussed herein. As show in FIG. 11, the base 24c does not have a dome. The walls of the base 24c radially extend directly from the gate 52. Not having a dome helps prevent puddle formation of resin near the gate 52. Avoiding puddle formation can reduce wasted resin. As shown in FIG. 11, without a dome 54, the strap rib 40c can extend directly or nearly continuously to the gate 52. The strap rib 40c can terminate near or at the gate 52 with a smooth transition into the wall near the gate 52 or the gate itself 52. The smooth transitions from the gate 52, the wall around the gate 52, the base end 43c, and/or strap rib 40c create a more uniform wall or surface of the base 24c, particularly around the gate 52 where a majority of the flexing due to base rollout occurs. The more uniform wall feature is better able to resist internal pressure as discussed herein, and in particular, resistance to bottle stretching and base rollout. The resistance to internal pressure is further enhanced by providing six strap ribs 43c that inhibit base 24c rollout. With more strap ribs 40c resisting internal pressure, the less likely the base 24c is to rollout under increased pressure. Further, more of the base 24c is formed by the petal walls 48c, which increases internal pressure resistance due to an increased surface area being provided by a spherical surface of the petal walls 48c as discussed herein.

Figure 12:
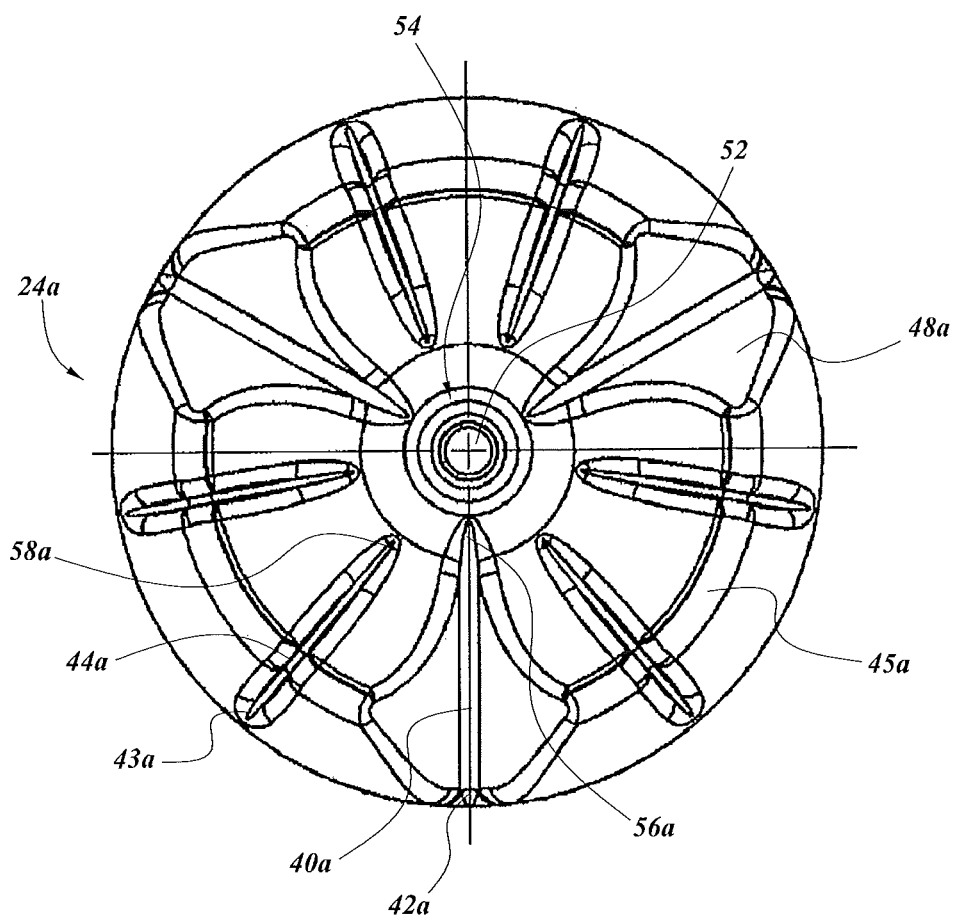
FIG. 12 illustrates a bottom view of an embodiment of a base.
Figure 13:
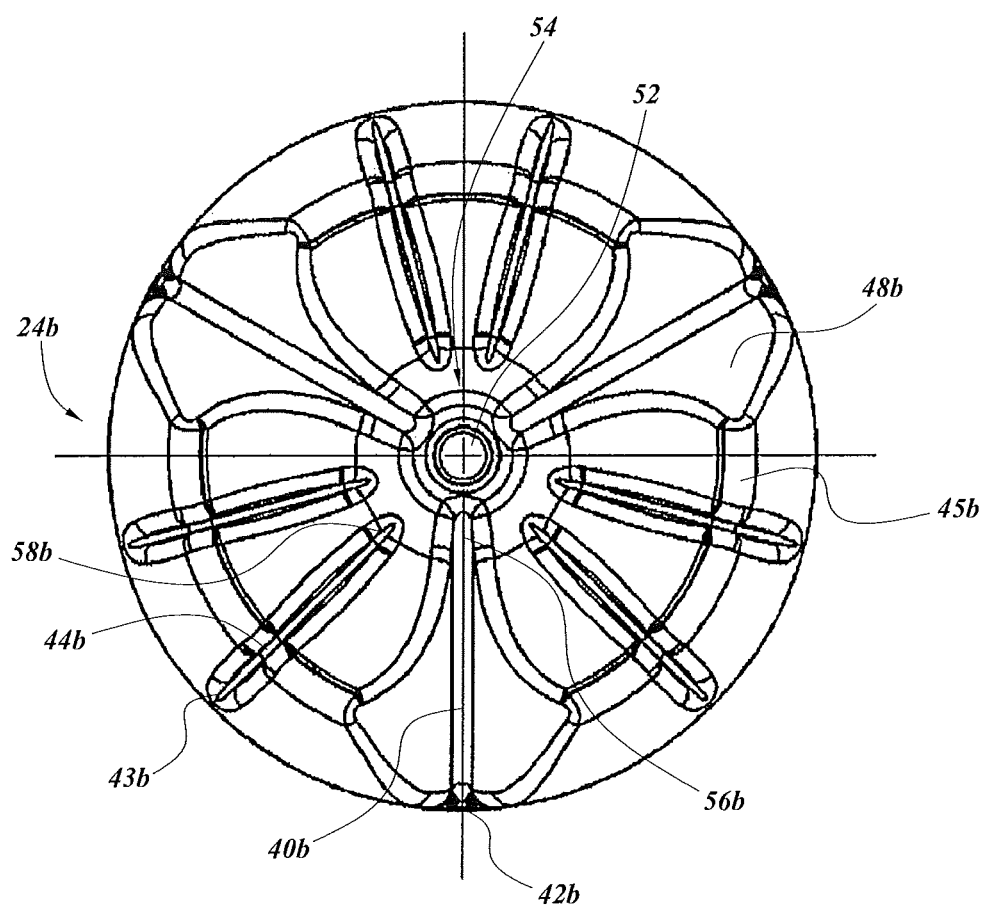
FIG. 13 illustrates a bottom view of another embodiment of a base.
Figure 14:
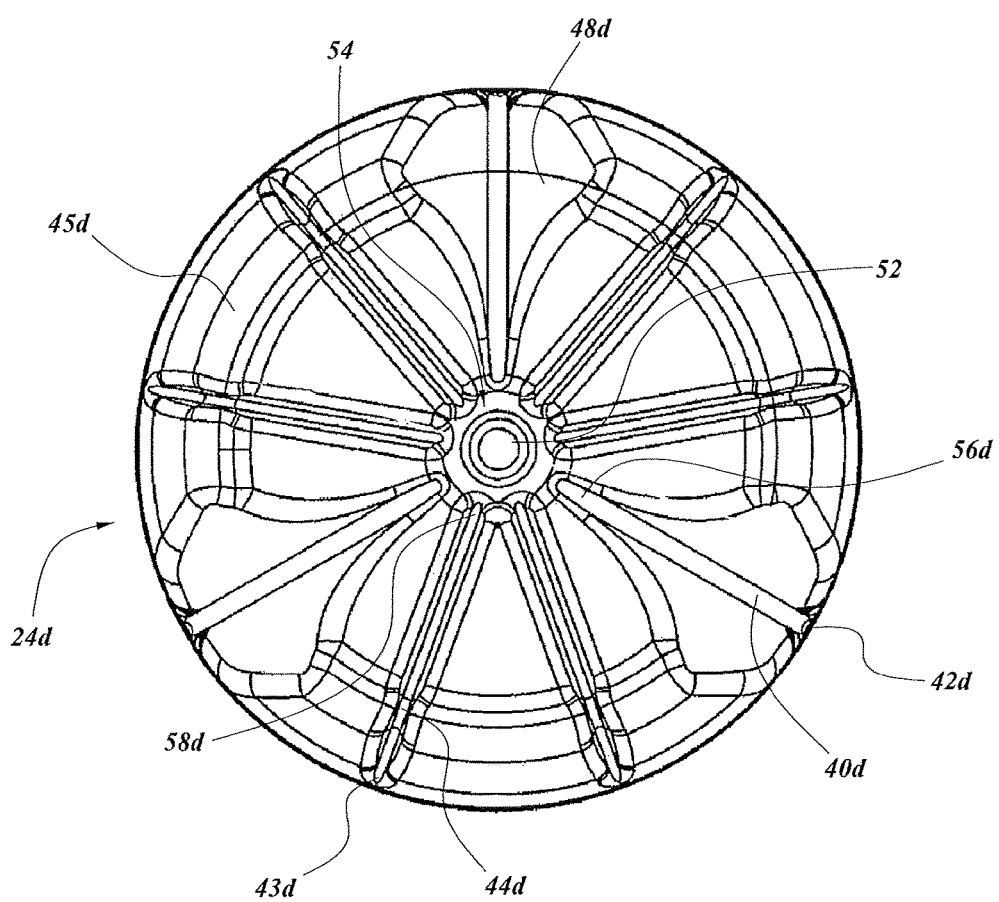
FIG. 14 illustrates a bottom view of another embodiment of a base.

FIGS. 12-15 illustrate bottom views of embodiments of the various bases discussed herein. FIGS. 12-14 show a series of bases that illustrate a gradual progression of some of the base ends 56a-d, 58a-d closer toward the gate 52. For example, as discussed herein, the base end 56b of the load rib 40b is closer to the gate 52 in the dome 54 than the base end 56a of the load rib 40a. As another example, as discussed herein, the base end 58b of the load rib 44b is closer to the gate 52 in the dome 54 than the base end 58a of the load rib 44a. As shown, in FIGS. 12 and 13, the base ends 58a,b of the load ribs 44a,b may be radially further away from the gate 52 than the base ends 56a,b of the strap ribs 40a,b. As shown in FIG. 14, the base ends 58c of the load ribs 44c may be radially equidistant from the gate 52 with the base ends 56c of the strap ribs 40c. In some embodiments, a closer proximity of the base ends 56a,b,c of the strap ribs 40a,b,c to the gate 52 may provide better internal pressure resistance as discussed herein. In some embodiments, a closer proximity of the base ends 58a,b,c of the load ribs 44a,b,c to the gate 52 may provide further better internal pressure resistance as discussed herein, although the primary internal pressure resistance is still provided by the strap ribs 40a,b,c. The base ends 58a,b,c of the load ribs 44a,b,c extending closer to the gate 52 with the base ends 56a,b,c of the strap ribs 40a,b,c can complement the pressure resistance provided by the strap ribs 40a,b,c.

Figure 15:
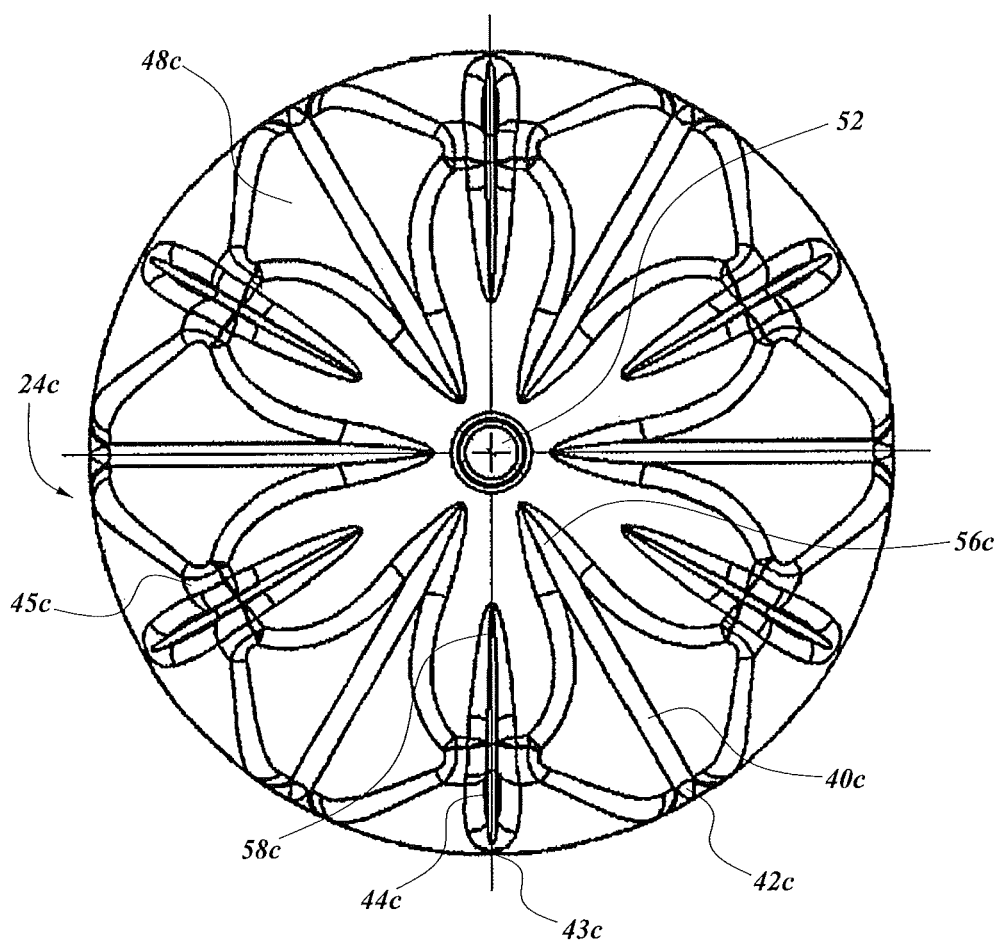
FIG. 15 illustrates a bottom view of another embodiment of a base.

As shown in FIG. 15, an embodiment of the base 24c without a dome 54c forms a more uniform wall around the gate 52. The strap ribs 40c can be a more smooth or continuous extension from or around the gate 52. The continuous extension from or around the gate 52 helps form a pressure resistance strap 9c (FIG. 17) that extends from the gate 52 to a top of the label portion 10. The continuous pressure resistance strap 9c is better able to resist internal pressure as discussed herein, and in particular, resistance to bottle stretching and base rollout.

Figure 16A:
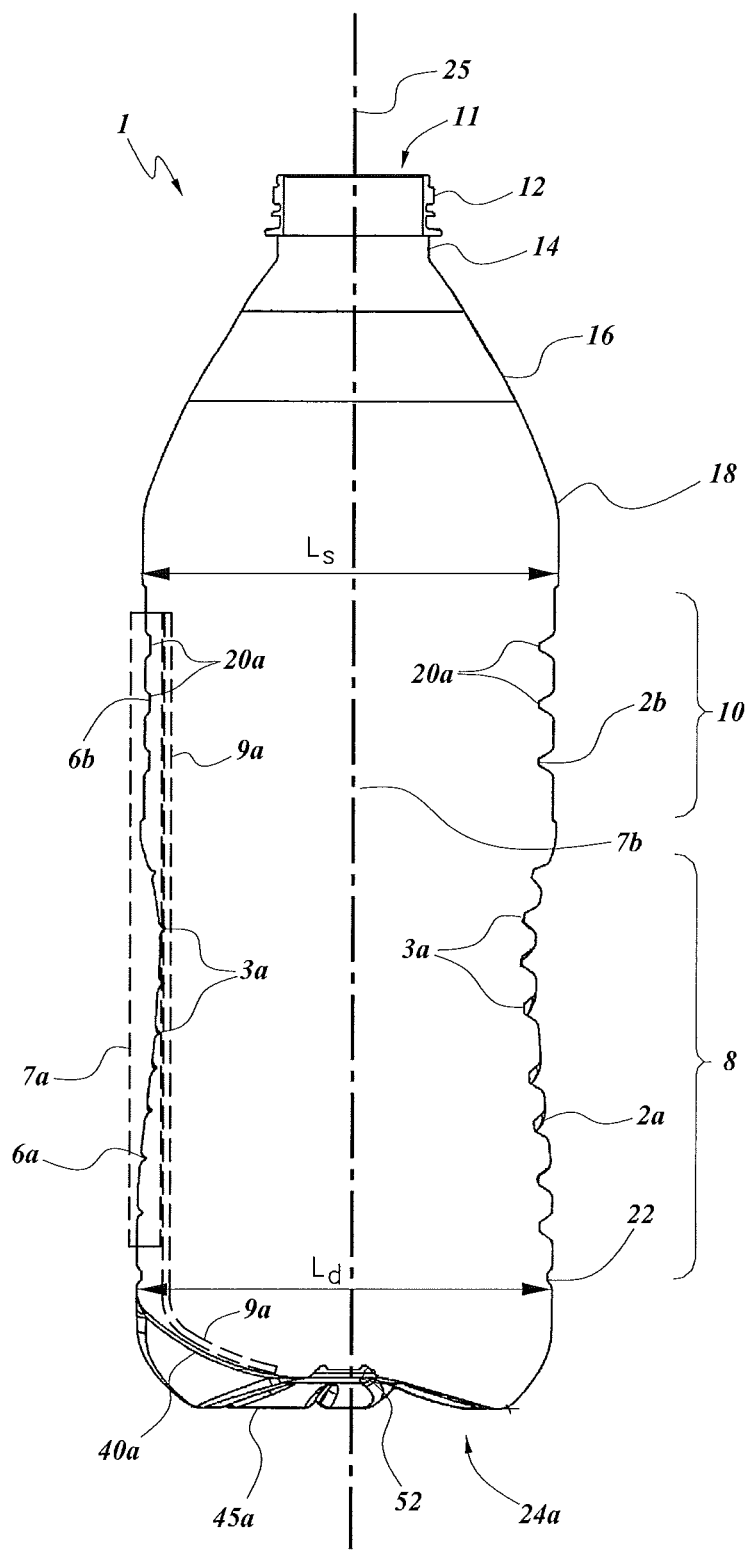
FIG. 16A illustrates a cross-section along a central axis of an embodiment of a bottle.

FIG. 16A illustrates a cross-section along the central axis 25 of an embodiment of the bottle 1 as illustrated in FIG. 2. As shown in FIG. 16A, the flat rib or recessed column 7a is located on the opposite side of the bottle circumference of the deep rib 2a,b portions (with, for example, an embodiment having three recessed columns 7a). In the illustrated embodiment, the base rib 22 has a constant cross-section throughout the circumference of the bottle 1. In some embodiments, the diameter Ld of the base 24 is larger by 0.5 to 2 millimeters, 0.6, 0.7, 0.8, 0.9, 1, 1.1, 1.2, 1.3, 1.4, 1.5, 1.6, 1.7, 1.8, or 1.9 millimeters, including ranges bordered and including the foregoing values, than any other diameter of the bottle 1. In an embodiment with the largest diameter of the bottle 1 being Ld, the bottle 1 has a single point of contact at just the base 24a with other substantially similar bottles in a production line and/or packaging. Further, a larger base 24a diameter Ld may improve stability when there is any damage to the base 24a. As shown in FIG. 16A, the diameter Ls at the shoulder 18 may be equal to the diameter Ld, which provides for two points of contact, at the shoulder 18 and base 24a, with other substantially similar bottles in a production line and/or packaging. In some embodiments, the diameter(s) in any portion of the bottle 1 varies, where the largest diameters create points of contact in a production line and/or packaging. The bottles may have either a single point of contact or multiple points of contact.

As shown in FIG. 16A, a strap rib 40a may vertically align with a recessed column 7a. The strap rib 40a and recessed column 7a in combination can form a pressure resistance band 9a that substantially extends from the gate 52 to a top portion of the label portion 10 or a top portion of the recessed column 7a. The pressure resistance band 9a provides resistance against internal pressure substantially for the base 24a and sidewall of the bottle 1 to, for example, inhibit stretching and/or base rollout as discussed herein.

Figure 16B:
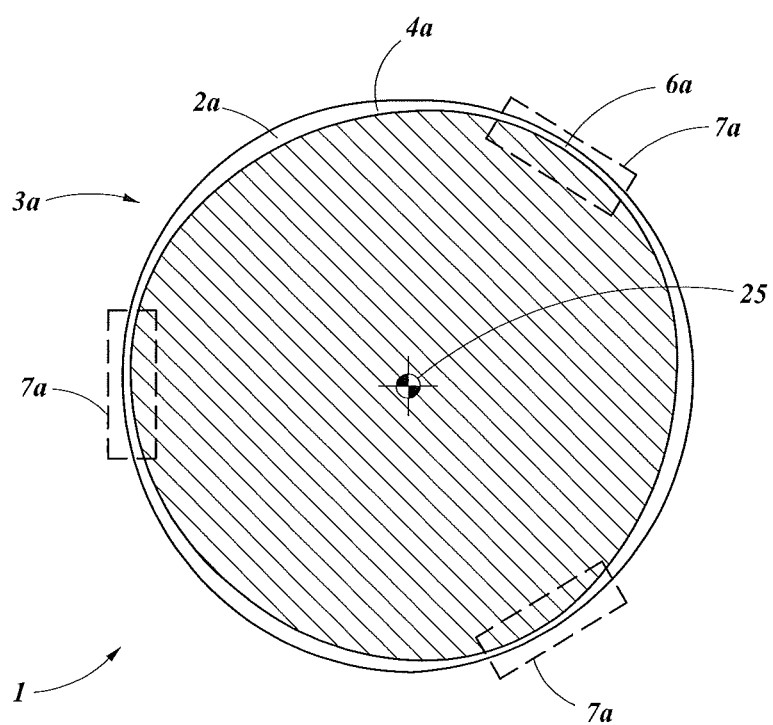
FIG. 16B illustrates an embodiment showing a cross-section of a bottle.
Figure 16C:
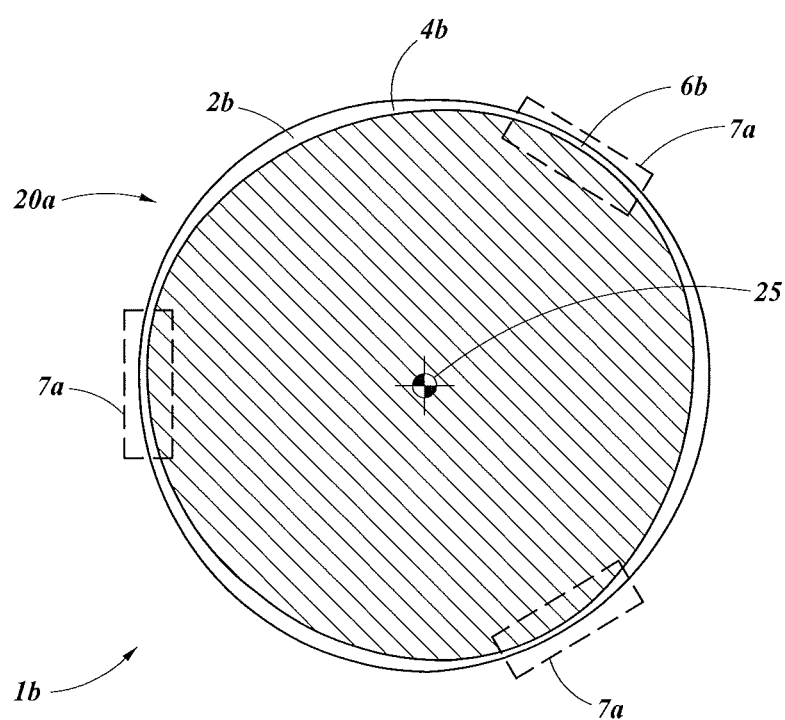
FIG. 16C illustrates an embodiment showing a cross-section of a bottle.

FIGS. 16B and 16C illustrate embodiments where the deep rib 2a,b is a depth that is larger than a depth of the middle rib 4a,b which is larger than a depth of the flattened and/or shallow rib 6a,b. The transition between the varying depths is smooth as depicted in FIG. 1A. In some embodiments, the transition may be some other form such as a step change connecting the varying depth portions or sections. In the illustrated embodiments, a grip portion rib 3a (i.e., sidewall ribs) has three deep rib 2a portions, six middle rib 4a portions, and three flattened and/or shallow rib 6a portions. As disclosed herein, the term "portions" can be equivalent to the term "sections" in reference to varying depth ribs.

Referring to FIG. 16B, an embodiment showing a cross-section of the bottle 1, looking down the vertical or central axis 25, illustrates a cross-section of a grip portion rib 3a. As disclosed herein, the term "vertical axis" can be equivalent of the term "central axis". The depth of the grip portion rib 3a varies from deep ribs 2a to flattened and/or shallow ribs 6a. The one or more flattened and/or shallow ribs 6a form an equivalent of recessed columns 7a at portions where a plurality flattened and/or shallow ribs 6a substantially vertically line up along the vertical or central axis 25 of the bottle 1 as illustrated in FIGS. 1 and 2. A plurality of deep ribs 2a substantially vertically line up along the vertical or central axis 25 of the bottle 1 as illustrated in FIGS. 1 and 2. A plurality of middle ribs 4a substantially vertically line up along the vertical or central axis 25 of the bottle 1 as illustrated in FIGS. 1 and 2.

In the illustrated embodiment with three lined-up flattened and/or shallow rib 6a portion, the bottle 1 respectively has three recessed columns 7a. The three recessed columns 7a are equally spaced apart around the circumference of the bottle and located on the opposite side of the bottle circumference from the deep rib 2a portions. However, the flattened and/or shallow ribs 6a may be unequally spaced apart around the circumference of the bottle 1. Further, any number of recessed columns 7a may be incorporated into a design of the bottle 1 by increasing or decreasing the number of flattened and/or shallow ribs 6a that substantially vertically line up along the vertical or central axis 25. For instance, the bottle may have as few as 1 or up to 10 recessed columns 7a, including 2, 3, 4, 5, 6, 7, 8, or 9 recessed columns 7, including ranges bordered and including the foregoing values. In the illustrated embodiment, the collections of flattened and/or shallow ribs 6a that form recessed columns 7a provide resistance to leaning, and/or load crushing, and/or stretching. Leaning can occur when during and/or after bottle packaging, a bottle experiences top load forces (tangential forces or otherwise) from other bottles and/or other objects stacked on top of the bottle. Similarly, top load crushing can occur due to vertical compression (or otherwise) forces from bottles and/or other objects stacked on top. Stretching can occur when a bottle is pressurized. In the illustrated embodiment, the recessed columns 7a transfer the resulting tangential or compression forces along the wall to the base 24a and increase bottle 1 rigidity. Deep ribs 2a of the grip label rib 3a provide the hoop strength that can be equivalent to the hoop strength of normal depth ribs. As with the flattened and/or shallow rib 6a portions, the deep rib 2a portions may vary from 1 to 10 in number on the grip panel ribs 3a, including 2, 3, 4, 5, 6, 7, 8, or 9 deep rib 2 portions, including ranges bordered and including the foregoing values.

As FIG. 16B illustrates, certain embodiments may minimize the triangle-shaped or flattened and/or shallow ribs 6a to 20-30%, including 21, 22, 23, 24, 25, 26, 27, 28, or 29%, of the bottle circumference, resulting in a respective 70-80%, including 71, 72, 73, 74, 75, 76, 77, 78, or 79%, of the bottle circumference being trapezoid-shaped or deep ribs 2a and middle ribs 4a, including ranges bordered and including the foregoing values. However, any ratio of triangle-shaped to trapezoidal ribs, or other shapes known in the art, may be utilized.

Referring to FIG. 16B, an embodiment showing a cross-section of the bottle 1, looking down the vertical or central axis 25, illustrates a cross-section of a label panel rib 20a (i.e., sidewall ribs). The depth of the label panel rib 20a varies from deep ribs 2b to flattened and/or shallow ribs 6b. The one or more flattened and/or shallow ribs 6b form an equivalent of recessed columns 7a at portions where a plurality flattened and/or shallow ribs 6b substantially vertically line up along the vertical or central axis 25 of the bottle 1 as illustrated in FIGS. 1 and 2. The recessed columns 7a can include one or more flattened and/or shallow ribs 6a of the grip portion 8 as discussed herein. A plurality of deep ribs 2b substantially vertically line up along the vertical or central axis 25 of the bottle 1 as illustrated in FIGS. 1 and 2. A plurality of middle ribs 4b substantially vertically line up along the vertical or central axis 25 of the bottle 1 as illustrated in FIGS. 1 and 2.

In the illustrated embodiment, with three lined-up flattened and/or shallow rib 6b portions, the bottle 1 respectively has three recessed columns 7a. The flattened and/or shallow ribs 6b of the label panel ribs 20a can vertically line up along the vertical or central axis 25 with the flattened and/or shallow ribs 6a of the grip portion ribs 3a to form the three recessed columns 7a. Thus, in some embodiments, the recessed columns 7a can extend along a majority or substantial entirety of the sidewall (e.g., height and/or length) of the bottle 1 as, for example, illustrated in FIG. 1.

In some embodiments, the flattened and/or shallow ribs 6b of the label panel ribs 20a are vertically misaligned with the flattened and/or shallow ribs 6a of the grip portion ribs 3a such that the label portion 10 has a set of recessed columns and the grip portion 8 has another set of recessed columns. Thus, the recessed column of the label portion 10 can be vertically misaligned from the recessed columns of the grip portion 8.

The plurality of deep ribs 2b of the label portion 10 can substantially vertically line up along the vertical or central axis 25 with the plurality of deep ribs 2a of the grip portion 8 as illustrated in FIGS. 1 and 2. In some embodiments, the plurality of deep ribs 2b of the label portion 10 can be vertically misaligned with the plurality of deep ribs 2a of the grip portion 8. The plurality of middle ribs 4b label portion 10 can substantially vertically line up along the vertical or central axis 25 with the middle ribs 4a of the grip portion 8 as illustrated in FIGS. 1 and 2. In some embodiments, the plurality of middle ribs 4b label portion 10 can be vertically misaligned with the middle ribs 4a of the grip portion 8.

In the illustrated embodiment, the three recessed columns 7a are equally spaced apart around the circumference of the bottle and located on the opposite side of the bottle circumference from the deep rib 2b portions. However, the flattened and/or shallow ribs 6a,b may be unequally spaced apart around the circumference of the bottle 1. Further, any number of recessed columns 7a may be incorporated into a design of the bottle 1 by increasing or decreasing the number of flattened and/or shallow ribs 6a,b that substantially vertically line up along the vertical or central axis 25. For instance, the bottle 1 may have as few as 1 or up to 10 recessed columns 7a, including 2, 3, 4, 5, 6, 7, 8, or 9 recessed columns 7a, including ranges bordered and including the foregoing values. In the illustrated embodiment, the collections of flattened and/or shallow ribs 6b that form recessed columns 7a provide resistance to leaning, load crushing, and/or stretching as discussed herein. In the illustrated embodiment, the recessed columns 7a transfer the resulting tangential or compression forces along the wall to the base 24a and increase bottle 1 rigidity. Deep ribs 2b of the label panel rib 20a provide the hoop strength that can be equivalent to the hoop strength of normal depth ribs. As with the flattened and/or shallow rib 6b portions, the deep rib 2b portions may vary from 1 to 10 in number on the label panel rib 20a, including 2, 3, 4, 5, 6, 7, 8, or 9 deep rib 2b portions, including ranges bordered and including the foregoing values.

A depth Dd of a deep rib 2a may vary from 1 to 10 millimeters, including 1.1, 1.2, 1.3, 1.4, 1.5, 1.6, 1.7, 1.8, 1.9, 2, 2.1, 2.2, 2.3, 2.4, 2.5, 2.6, 2.7, 2.8, or 2.9 millimeters, or 1 to 9, 1 to 7, 1 to 5, or 1 to 3 millimeters, including ranges bordered and including the foregoing values.

A depth DL of label panel rib 20a (i.e., deep rib 2b) may vary from 0.5 to 10 millimeters, including 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.9, 4, 4.1, 4.2, 4.3, 4.4, 4.5, 4.6, 4.7, 4.8, or 4.9 millimeters, 0.5 to 9, 0.5 to 7, 0.5 to 5, or 0.5 to 3 millimeters, including ranges bordered and including the foregoing values.

A depth Dm of a middle rib 4a may vary from 0.5 to 5 millimeters, including 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, or 4.9 millimeters, including ranges bordered and including the foregoing values. The length of the root wall 136 may vary from 0.3 to 2.5 millimeters, including 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, or 2.4 millimeters, including ranges bordered and including the foregoing values. The ratio of Dd of the deep ribs 2a to the Dm of middle ribs 4a may vary from 1:1 to 20:1, including 2:1, 3:1, 4:1, 5:1, 6:1, 7:1, 8:1, 9:1, 10:1, 11:1, 12:1, 13:1, 14:1, 15:1, 16:1, 17:1, 18:1, or 19:1, including ranges bordered and including the foregoing values.

A depth Df of a shallow rib 6a may vary from 0 to 2.5 millimeters, including 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 12, 2.3, or 2.4 millimeters, including ranges bordered and including the foregoing values. The ratio of Dd of the deep ribs 2a to the Df of the flattened and/or shallow ribs 6a may vary from 11 to 100:1, including 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, or 29:1, or 1:1 to 90:1, 1:1 to 80:1, 1:1 to 70:1, 1:1 to 60:1, 1:1 to 50:1, 1:1 to 40:1, 1:1 to 30:1 or 1:1 to 20:1, including ranges bordered and including the foregoing values, including where Df is zero, resulting in an infinite ratio. The ratio of Dm of the middle ribs 4a to the Df of the flattened and/or shallow ribs 6a may vary from 1:1 to 50:1, including 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, or 24:1 or 1:1 to 40:1, 1:1 to 30:1, or 1:1 to 20:1, including ranges bordered and including the foregoing values, including where Df is zero, resulting in an infinite ratio.

A depth Ds of a flattened and/or shallow rib 6b may vary from 0 to 2.5 millimeters, including 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, or 2.4 millimeters, including ranges bordered and including the foregoing values. The ratio of Dd of the deep ribs 2a to the Ds of the flattened and/or shallow ribs 6b may vary from 1:1 to 100:1, including 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, or 29:1, or 1:1 to 90:1, 1:1 to 80:1, 1:1 to 70:1, 1:1 to 60:1, 1:1 to 50:1, 1:1 to 40:1, 1:1 to 30:1 or 1:1 to 20:1, including ranges bordered and including the foregoing values, including where Ds is zero, resulting in an infinite ratio. The ratio of DL of the deep ribs 2b to the Ds of the flattened and/or shallow ribs 6b may vary from 1:1 to 100:1, including 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, or 29:1, or 1:1 to 90:1, 1:1 to 80:1, 1:1 to 70:1, 1:1 to 60:1, 1:1 to 50:1, 1:1 to 40:1, 1:1 to 30:1 or 1:1 to 20:1, including ranges bordered and including the foregoing values, including where Ds is zero, resulting in an infinite ratio. The ratio of Dm of the middle ribs 4a, 4b to the Ds of the flattened and/or shallow ribs 6b may vary from 1:1 to 50:1, including 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, or 24:1 or 1:1 to 40:1, 1:1 to 30:1, or 1:1 to 20:1, including ranges bordered and including the foregoing values, including where Ds is zero, resulting in an infinite ratio. The ratio of DL of the deep ribs 2b to the Ds of the flattened and/or shallow ribs 6b may vary from 1:1 to 100:1, including 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, or 29:1, or 1:1 to 90:1, 1:1 to 80:1, 1:1 to 70:1, 1:1 to 60:1, 1:1 to 50:1, 1:1 to 40:1, 1:1 to 30:1 or 1:1 to 20:1, including ranges bordered and including the foregoing values, including where Ds is zero, resulting in an infinite ratio.

Figure 17:
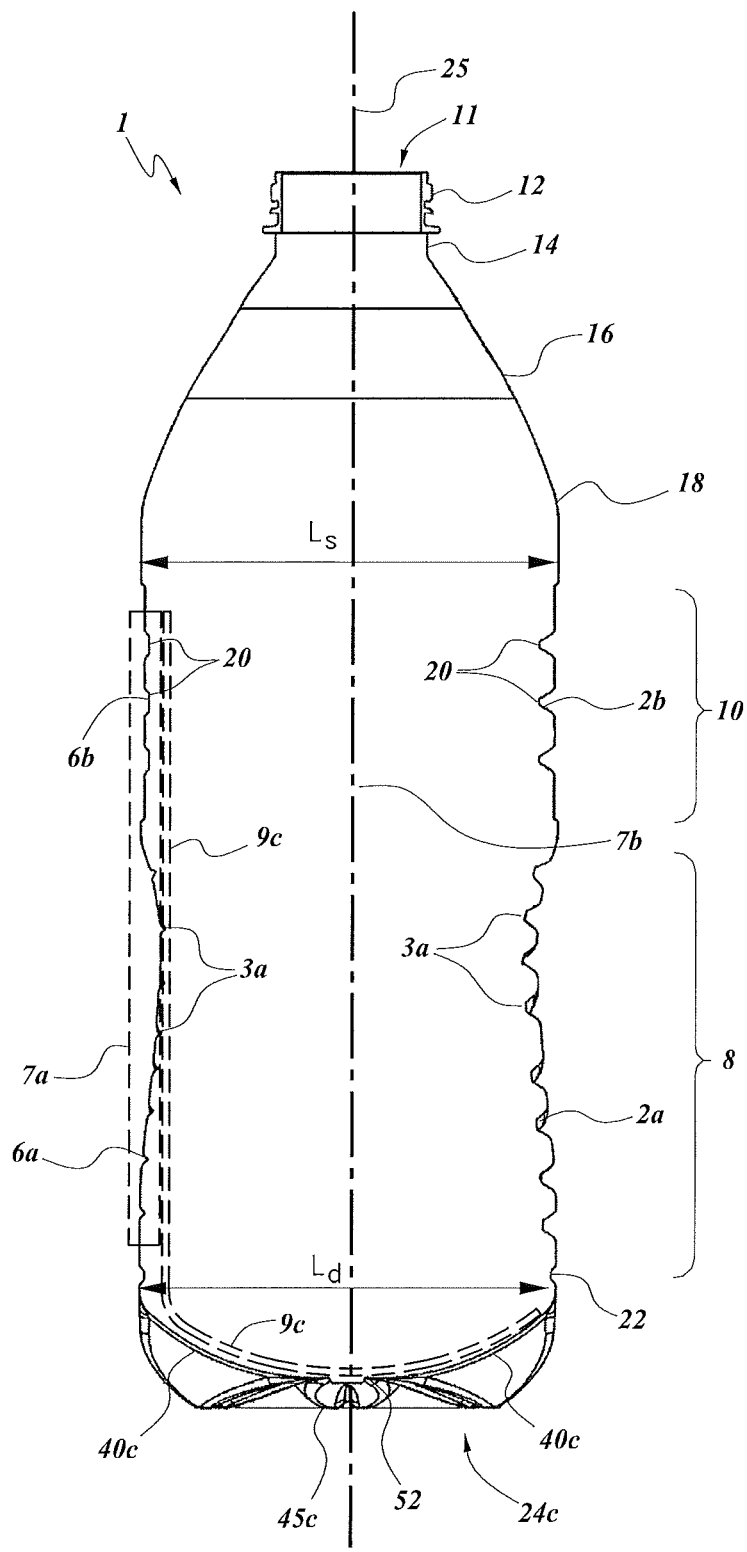
FIG. 17 illustrates a cross-section along the central axis of another embodiment of a bottle.

FIG. 17 illustrates a cross-section along the central axis 25 of an embodiment of the bottle 1 as illustrated in FIG. 3. As shown in FIG. 17, the flat rib or recessed column 7a is located on the opposite side of the bottle circumference of the deep rib 2a portions (with, for example, an embodiment having three recessed columns 7a). In the illustrated embodiment, the base rib 22 has a constant cross-section throughout the circumference of the bottle 1. The features and function of various diameters, including Ld and Ls, can be utilized as discussed herein.

Figure 25:
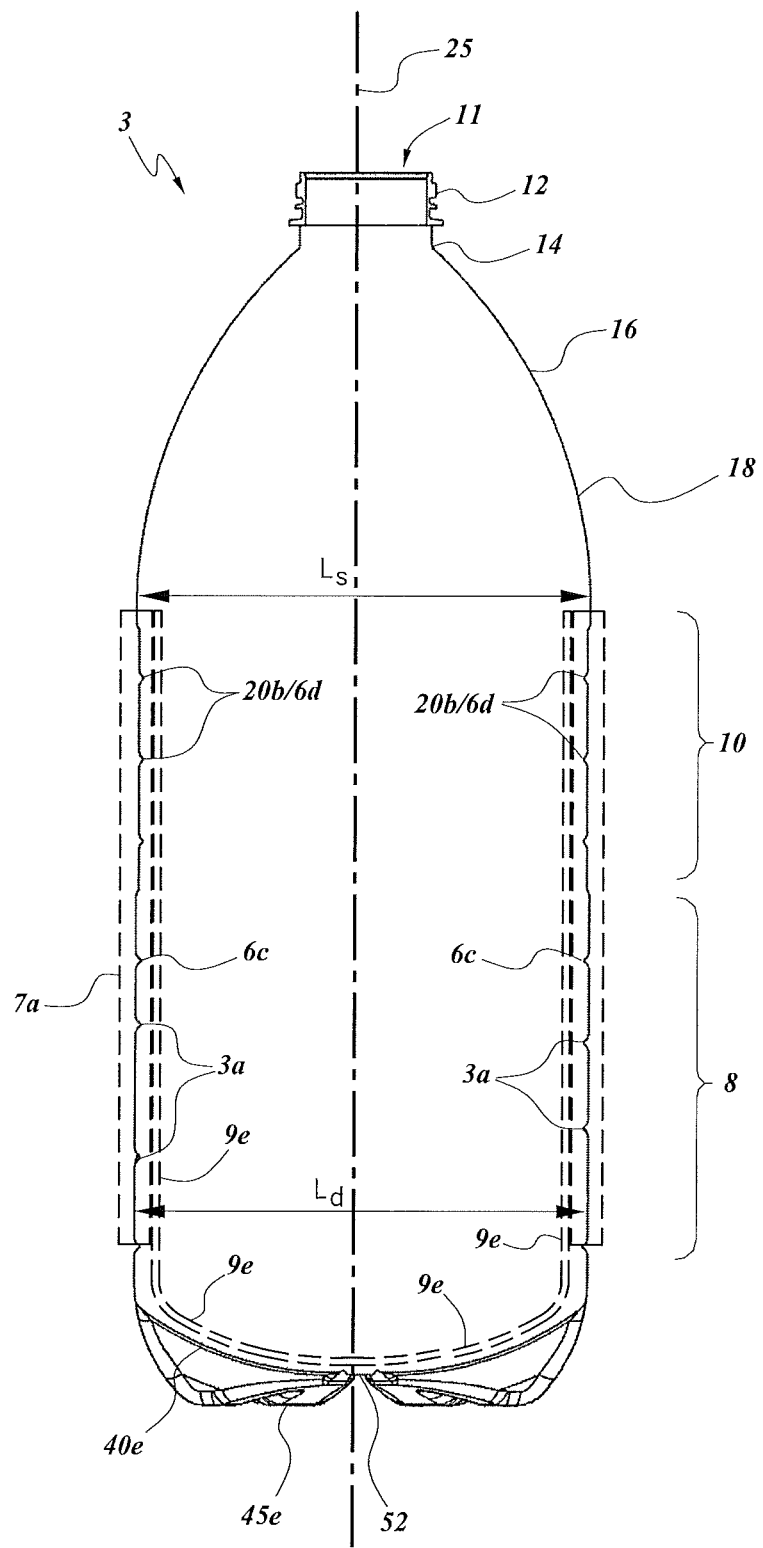
FIG. 25 illustrates a cross-section along the central axis of another embodiment of a bottle.

As shown in FIG. 17, a strap rib 40a may vertically align with a recessed column 7a. Another strap rib 40a may vertically align with the deep rib 2a,b portions. In the illustrated embodiment, the two strap ribs 40a and recessed column 70a in combination can form a pressure resistance band 9c that substantially extends from the base rib 22 near the deep ribs 2a, through the gate 52, and to a top portion of the label portion 10 or a top portion of the recessed column 7a. The pressure resistance band 9c provides resistance against internal pressure substantially continuously through the base 24c to the sidewall of the bottle 1 to, for example, inhibit stretching and base rollout as discussed herein. In some embodiments, the other strap rib 40a may vertically align another recessed column 7a where, for example, the bottle 1 has six recessed columns 7a. A pressure resistance band may be formed by the combination of two recessed columns and two strap ribs. The pressure resistance band may extend from a top portion of the label portion 10 on one side of the bottle 1, down the sidewall on the one side of the bottle 1 and through the gate 52, up the sidewall on the other side of the bottle 1 to a top portion of the label portion 10 on the other side of the bottle 1 to provide pressure resistance as discussed here and substantially continuously through a longitudinal perimeter of the bottle 1 (along the central axis 25 at the sidewalls and through the central axis at the base 24c). For example, FIG. 25 illustrates such an embodiment.

Figure 18:
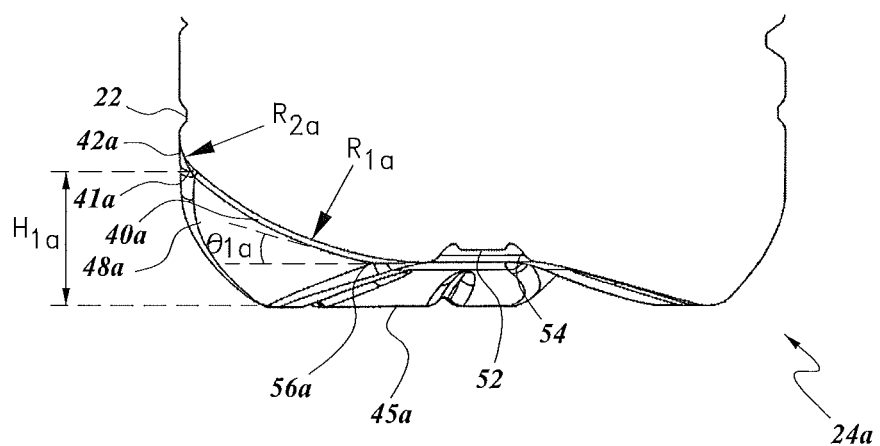
FIG. 18 illustrates a cross-section along the central axis of an embodiment of a base.

FIG. 18 illustrates a cross-section along the central axis 25 of an embodiment of the base 24a as illustrated in FIG. 16A. As shown in FIG. 18, the base 24a has a strap rib 40a that begins from the base end 56a with a positive slope upward (relative to a resting surface of the base 24a of the bottle 1) at an angle θ1a toward the sidewall of the bottle 1. Stated differently, the strap rib 40a does not proceed toward or get closer to the resting surface from the base end 56a surface before proceeding upwardly to connect to the sidewall of the bottle 1. The immediate or near immediate upward/positive slope at the angle θ1a of the strap rib 40a relative to the resting surface toward the sidewall of the bottle 1 helps inhibit flexing of the gate 52 and dome 54 due to internal pressures. The upward/positive slope at the angle θ1a combined with a connection to a sidewall of the bottle 1 at the sidewall end 42a as discussed herein further helps inhibit flexing of the gate 52 and dome 54 due to internal pressures. In some embodiments, the angle θ1a may initially be zero and positively increase along radius R1a as the strap rib proceeds away from the base end 56a toward the sidewall end 42a. In some embodiments, the larger the angle θ1a is starting from the base end 56a, the larger the pressure resistance will be. In some embodiments, angle θ1a may vary from 0 to 60 degrees, including 5 to 50, 10 to 55, 15 to 50, 20 to 45, 25 to 35, 20 to 30, including up to 45, up to 40, up to 35, up to 30, up to 25, and up to 20, including ranges bordered and including the foregoing values. In some embodiments, the angle θ1a may initially be negative from the base end 56a with a radius (curve) of the strap rib 40a curving the strap rib 40a toward the sidewall end 42a as discussed herein without departing from the scope of the features and functions disclosed herein.

The strap rib 40a extends from the base end 56a to the sidewall end 42a along one or more radii. As shown in FIG. 18, the strap rib 40a may extend from the base end 56a with a radius R1a and transition to a radius R2a to terminate at the sidewall end 42a near or at the base rib 22. In some embodiments, the radius R1a may vary from 20 to 80 millimeters, including 25 to 75, 30 to 65, 35 to 60, 40 to 55, and including 50 millimeters, including ranges bordered and including the foregoing values, where for example, the diameter (Ld and/or Ls) of the bottle 1 may vary from 30 to 200 millimeters, including 30 to 40, 30 to 50, 40 to 60, 50 to 70, 60 to 80, 40 to 190, 50 to 180, 60 to 170, 70 to 160, 80 to 150, 90 to 140, 100 to 130, and 110 to 120 millimeters, including ranges bordered and including the foregoing values. The ratio of radius R1a to bottle diameter can vary from 8:1 to 1:10, including 7:1, 6:1, 5:1, 4:1, 3:1, 2:1, 1:1, 1:2, 1:3, 1:4, 1:5, 1:6, 1:7, 1:8 and 1:9, including ranges bordered and including the foregoing values. In some embodiments, the radius R2a may vary from 1 to 25 millimeters, including 5 to 10, 5 to 20, 5 to 10, 1 to 10, 1 to 5, and 10 to 20 millimeters, including ranges bordered and including the foregoing values, where for example, the diameter (Ld and/or Ls) of the bottle 1 may vary from 30 to 200 millimeters, including 30 to 40, 30 to 50, 40 to 60, 50 to 70, 60 to 80, 40 to 190, 50 to 180, 60 to 170, 70 to 160, 80 to 150, 90 to 140, 100 to 130, and 110 to 120 millimeters, including ranges bordered and including the foregoing values. The ratio of radius R2a to bottle diameter can vary from 1:1 to 1:200, including 1:10, 1:20, 1:30, 1:40, 1:50, 1:60, 1:70, 1:80, 1:90, 1:100, 1:120, 1:130, 1:140, 1:150, 1:160, 1:170, 1:180, 1:190, including ranges bordered and including the foregoing values. The above ranges and/or ratios are provided as examples. In some embodiments, the radii of the strap rib 40a and/or diameter of the bottle or other types of containers may exceed the above stated ranges and/or ratios, such as, for example, in barrel-type containers.

In some embodiments, the radius R1a and/or radius R2a are relatively large or infinite. Stated differently, the strap rib 40a can be straight or nearly straight from the base end 56a to the sidewall end 42a. A straight strap rib can resist more pressure. Providing a curvature with one or more radii to the strap rib can improve the blowing process to help prevent poorly blown bottles, which may reduce pressure resistance. In some embodiments, the strap rib 40a is a combination of curved and straight portions, such as, for example, as discussed in reference to FIG. 19.

In some embodiments, the transition 41a from radius R1a to radius R2a (or more than one transition with a strap rib having more than two radii) can occur anywhere along the strap rib 40a. As show in FIG. 18, the transition 41a from radius R1a to radius R2a may occur at height H1a. In some embodiments, the height H1a may vary from 5 to 30 millimeters, including 10 to 25 and 15 to 20, including ranges bordered and including the foregoing values, where for example, the height of the bottle 1 may vary from 65 to 300 millimeters, including 80 to 290, 90 to 270, 100 to 260, 110 to 250, 120 to 240, 130 to 230, 140 to 220, 150 to 210, 160 to 200, 170 to 190, including ranges bordered and including the foregoing values. The ratio of height H1a to bottle height can vary from 1:3 to 1:60, including 1:4, 1:5, 1:6, 1:7, 1:8, 1:9, 1:10, 1:11, 1:12, 1:13, 1:14, 1:15, 1:20, 1:25, 1:30, 1:40, 1:45, 1:50, and 1:55, including ranges bordered and including the foregoing values. The above ranges and/or ratios are provided as examples. In some embodiments, height H1a and/or height of the bottle or other types of containers may exceed the above stated ranges and/or ratios, such as, for example, in barrel-type containers.

Figure 19:
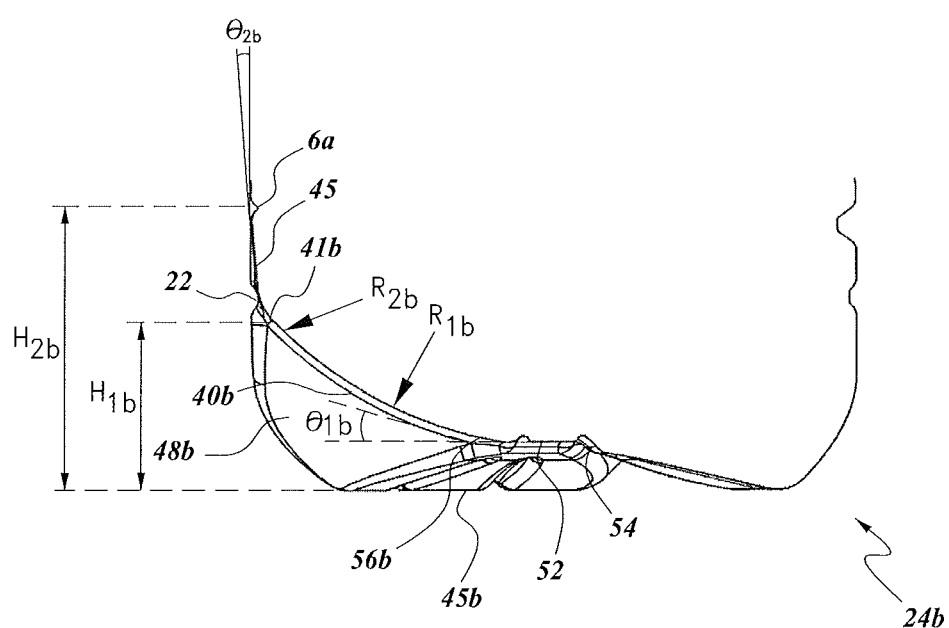
FIG. 19 illustrates a cross-section along the central axis of another embodiment of a base.

FIG. 19 illustrates a cross-section along the central axis 25 of an embodiment of the base 24b as illustrated in FIG. 17. As shown in FIG. 19, the base 24b has a strap rib 40b that begins from the sidewall end 56b with a positive slope upward (relative to a resting surface of the base 24a of the bottle 1) at an angle θ1b toward the sidewall of the bottle 1. Stated differently, the strap rib 40a does not proceed toward or get closer to the resting surface before proceeding upwardly to connect to the sidewall of the bottle 1. The immediate or near immediate upward/positive slope at the angle θ1b of the strap rib 40a relative to the resting surface toward the sidewall of the bottle 1 helps inhibit flexing of the gate 52 and dome 54 due to internal pressures. The upward/positive slope at the angle θ1b combined with a connection to a sidewall of the bottle 1 at the sidewall end 42b as discussed herein further helps inhibit flexing of the gate 52 and dome 54 due to internal pressures. In some embodiments, the angle θ1b may initially be zero and positively increase along radius R1b as the strap rib proceeds away from the base end 56b toward the sidewall end 42b. In some embodiments, the larger the angle θ1b is starting from the base end 56b, the larger the pressure resistance will be. In some embodiments, angle θ1b may vary from 0 to 60 degrees, including 5 to 50, 10 to 55, 15 to 50, 20 to 45, 25 to 35, 20 to 30, including up to 45, up to 40, up to 35, up to 30, up to 25, and up to 20, including ranges bordered and including the foregoing values. In some embodiments, the angle θ1b may initially be negative from the base end 56b with a radius (curve) of the strap rib 40b curving the strap rib 40b toward the sidewall end as discussed herein without departing from the scope of the features and functions disclosed herein.

The strap rib 40b extends from the base end 56b to the sidewall end 42b along one or more radii. As shown in FIG. 19, the strap rib 40b may extend from the base end 56a with a radius R1b and transition 41b to a radius R2b through the base rib 22, followed by a transition 43b to a straight portion 45 to terminate at the sidewall end 42b near, at, in the first shallow rib 6a as discussed herein. In some embodiments, the radius R1b may vary from 20 to 85 millimeters, including 25 to 80, 30 to 70, 35 to 65, 40 to 60, 45 to 55 and including 50 millimeters, including ranges bordered and including the foregoing values, where for example, the diameter (Ld and/or Ls) of the bottle 1 may vary from 30 to 200 millimeters, including 30 to 40, 30 to 50, 40 to 60, 50 to 70, 60 to 80, 40 to 190, 50 to 180, 60 to 170, 70 to 160, 80 to 150, 90 to 140, 100 to 130, and 110 to 120 millimeters, including ranges bordered and including the foregoing values. The ratio of radius R1b to bottle diameter can vary from 9:1 to 1:10, including 8:1, 7:1, 6:1, 5:1, 4:1, 3:1, 2:1, 1:1, 1:2, 1:3, 1:4, 1:5, 1:6, 1:7, 1:8 and 1:9, including ranges bordered and including the foregoing values. In some embodiments, the radius R2b may vary from 0 to 30 millimeters, including 5 to 25, 5 to 20, 5 to 10, 1 to 10, and 10 to 20 millimeters, including ranges bordered and including the foregoing values, where for example, the diameter (Ld and/or Ls) of the bottle 1 may vary from 30 to 200 millimeters, including 30 to 40, 30 to 50, 40 to 60, 50 to 70, 60 to 80, 40 to 190, 50 to 180, 60 to 170, 70 to 160, 80 to 150, 90 to 140, 100 to 130, and 110 to 120 millimeters, including ranges bordered and including the foregoing values. The ratio of radius R2b to bottle diameter can vary from 1:1 to 1:200, including 1:10, 1:20, 1:30, 1:40, 1:50, 1:60, 1:70, 1:80, 1:90, 1:100, 1:120, 1:130, 1:140, 1:150, 1:160, 1:170, 1:180, 1:190, including ranges bordered and including the foregoing values, or infinite with a radius R2b that is zero. The above ranges are provided as examples. In some embodiments, the radii of the strap rib and/or diameter of the bottle or other types of containers may exceed the above stated ranges and/or ratios, such as, for example, in barrel-type containers.

In some embodiments, the radius R1*b* and/or radius R2*b* are relatively large or infinite. Stated differently, the strap rib 40*b* can be straight or nearly straight from the base end 56*b* to the sidewall end 42*b*. A straight strap rib can resist more pressure. Providing a curvature with one or more radii to the strap rib can improve the blowing process to help prevent poorly blown bottles, which may reduce pressure resistance. In some embodiments, the strap rib 40*b* has more than one straight portion 45 as discussed herein positioned anywhere along the strap rib 40*b* from the base sidewall end 42*b* to the base end 56*b*. The straight portions 45 can be positioned to connect with curved portions and/or other straight portions of the strap rib 40*b*. The straight portions 45 can be any length, including substantially an entire length of the strap rib 40*b* from the sidewall end 42*b* to the base end 56*b*.

In some embodiments, the transition 41*b* from radius R1*b* to radius R2*b* (or more than one transition with a strap rib having more than two radii) can occur anywhere along the strap rib 40*b*. As shown in FIG. 19, the transition 41*b* from radius R1*b* to radius R2*b* may occur at height H1*b*. In some embodiments, the height H1*b* may vary from 5 to 35 millimeters, including 10 to 30, 15 to 25, and 15 to 20, including ranges bordered and including the foregoing values, where for example, the height of the bottle 1 may vary from 65 to 300 millimeters, including 80 to 290, 90 to 270, 100 to 260, 110 to 250, 120 to 240, 130 to 230, 140 to 220, 150 to 210, 160 to 200, 170 to 190, including ranges bordered and including the foregoing values. The ratio of height H1*b* to bottle height can vary from 1:2 to 1:60, including 1:3, 1:4, 1:5, 1:6, 1:7, 1:8, 1:9, 1:10, 111, 1:12, 1:13, 1:14, 1:15, 1:20, 1:25, 1:30, 1:40, 1:45, 1:50, and 1:55, including ranges bordered and including the foregoing values. The above ranges and/or ratios are provided as examples. In some embodiments, height H1*b* and/or height of the bottle or other types of containers may exceed the above stated ranges and/or ratios, such as, for example, in barrel-type containers.

In some embodiments, the transition 43*b* from radius R2*b* (or R1*b* in some embodiments) to the straight portion 45 can occur anywhere along the strap rib 40*b*. As shown in FIG. 19, the transition from radius R2*b* (or R2*b* in some embodiments) to the straight portion 45 may occur at height H2*b*. In some embodiments, the height H2*b* may vary from 10 to 60 millimeters, including 15 to 55, 20 to 50, 25 to 45, and 30 to 40, including ranges bordered and including the foregoing values, where for example, the height of the bottle 1 may vary from 65 to 300 millimeters, including 80 to 290, 90 to 270, 100 to 260, 110 to 250, 120 to 240, 130 to 230, 140 to 220, 150 to 210, 160 to 200, 170 to 190, including ranges bordered and including the foregoing values. The ratio of height H2*b* to bottle height can vary from 1:2 to 1:60, including 1:3, 1:4, 1:5, 1:6, 1:7, 1:8, 1:9, 1:10, 1:11, 1:12, 1:13, 1:14, 1:15, 1:20, 1:25, 1:30, 1:40, 1:45, 1:50, and 1:55, including ranges bordered and including the foregoing values. In some embodiments, the straight portion 45 may extend into the sidewall of the bottle 1 straight from radius R2*b* at an angle θ2*b* relative to the bottle sidewall (or central axis). The angle θ2*b* may vary from 0 to 15 degrees, including 1, 2, 3, 4, 5, 6, 7, 8, 9, 10, 11, 12, 13, and 14 degrees, including ranges bordered and including the foregoing values. The above ranges and/or ratios are provided as examples. In some embodiments, height H2*b* and/or height of the bottle or other types of containers may exceed the above stated ranges and/or ratios, such as, for example, in barrel-type containers.

Figure 20:
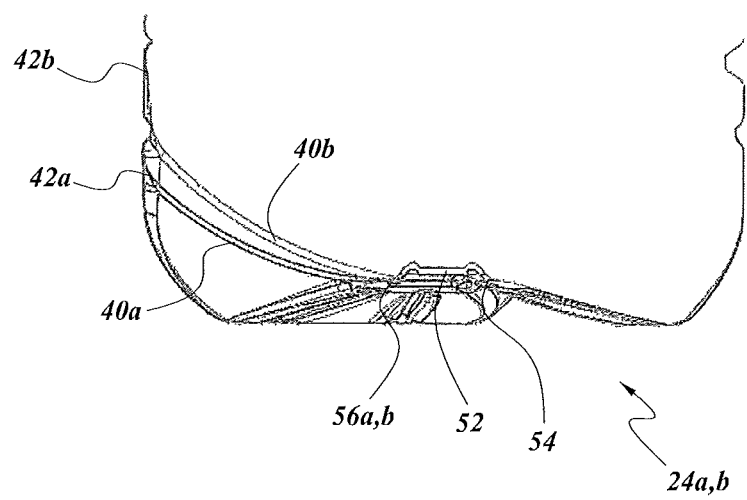
FIG. 20 illustrates overlaid cross-sections along the central axis of embodiments of bases.

FIG. 20 illustrates cross-sections along the central axis 25 of embodiments of overlaid bases 24*a,b* as illustrated in FIGS. 18 and 19. As discussed herein, and in particular, in reference to FIGS. 18 and 19, both strap ribs 40*a,b* extend from the dome 54 and/or gate 52 from base end 56*a,b* at a positive angle sloping upwards toward the sidewall of the bottle 1. As shown in FIG. 20, the strap rib 40*b* that extends further up the bottle sidewall may extend from the base end 56*a,b* at a more positive angle upward toward the bottle sidewall to the sidewall end 42*b* relative to the positive angle upward of the strap rib 40*a*. The strap rib 40*b* has a greater radius of curvature R1*b* than the radius of curvature of R1*a* of the strap rib 40*a* to extend further up the bottle sidewall as discussed herein.

Figure 21:
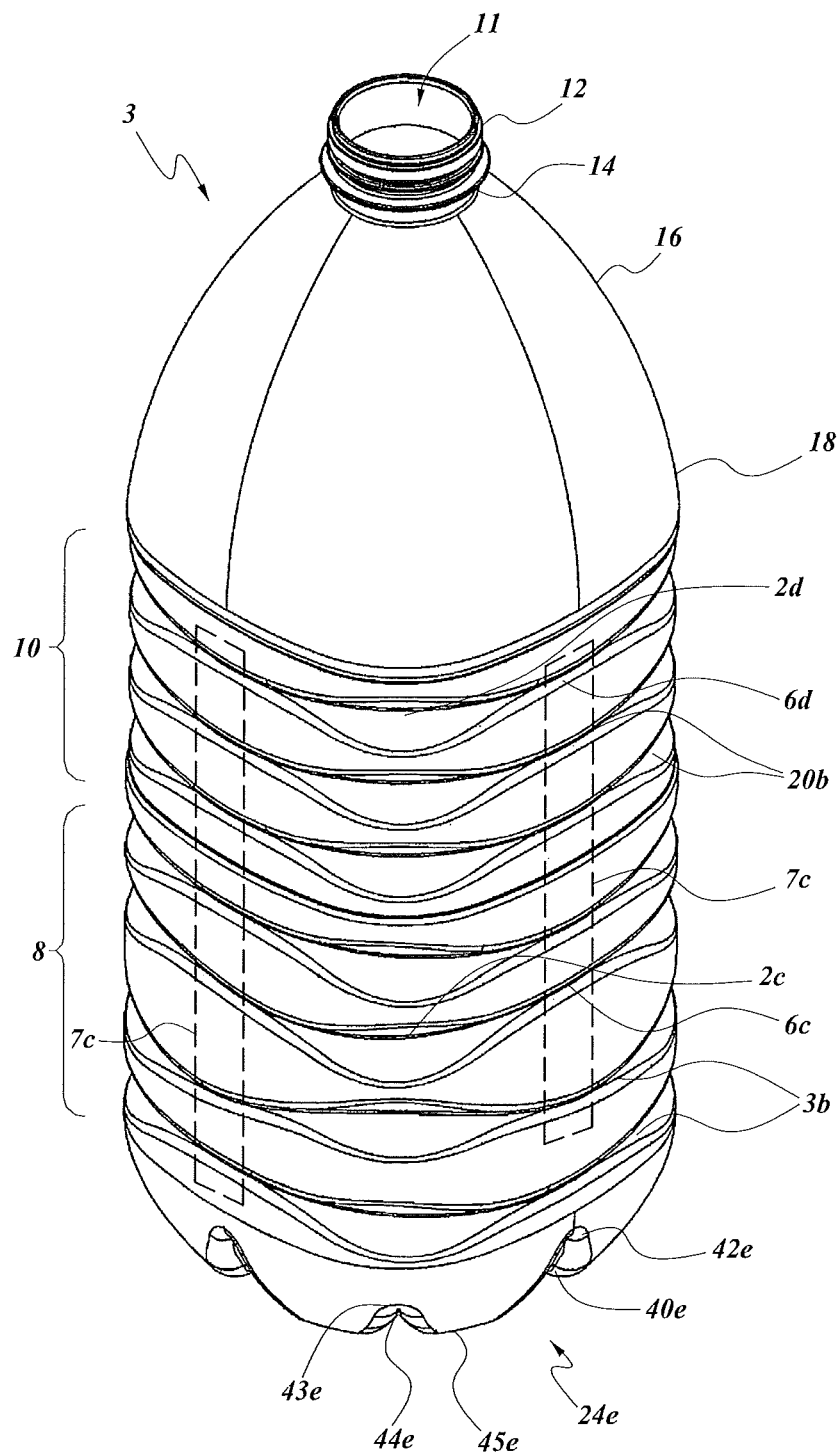
FIG. 21 illustrates a top perspective view of an embodiment of a bottle.

FIG. 21 illustrates a top perspective view of an embodiment of a bottle 3. The bottle 3 is a substantially square bottle with four walls. The four corners of the bottle 3 are rounded for ease of usability and ease of blowing. The bottle 3 has a base 24*e* that extends to a grip portion 8. The grip portion 8 comprises a plurality of grip portion ribs 3*b* (i.e., sidewall ribs). As illustrated in FIG. 21, grip portion ribs 3*b* (positioned in the grip portion 8) may vary in depth by separating or transitioning from the rib a deep rib 2*c* to a flattened and/or shallow rib 6*c* to be discussed in further detail below.

Referring to FIG. 21, a label portion 10 is connected to the grip portion 8 and comprises one or more label panel ribs 20*b* (i.e., sidewall ribs). The label panel portion 10 transitions into a shoulder 18, which connects to a bell 16. The bell 16 may include scallops (including as illustrated) or other design features or it may be smooth and generally unornamented. The bell 16 connects to a neck 14, which connects to a finish 12. From the label portion 10, the bell 16 leads upward and radially inward, relative to a central axis 25, to the neck 14 and finish 12. The finish 12 can be adapted to receive a closure to seal contents in the bottle 3. The finish 12 defines an opening 11 that leads to an interior of the bottle 3 for containing a beverage and/or other contents. The interior can be defined as at least one of the finish 12, the neck 14, the bell 16, the shoulder 18, the label portion 10, the grip portion 8, or the base 24*e*.

A substantially vertical wall (or sidewall) comprising the grip portion 8 and label portion 10 between the base 24*e* and the bell 16, extending substantially along the central axis 25 to define at least part of the interior of the bottle 3, can be considered a sidewall of the bottle 3. In some embodiments, the sidewall may include the bell 16, shoulder 18, and/or base 24*e*. The perimeter of the sidewall is substantially perpendicular to the central axis 25 of the interior. The sidewall defines at least part of the interior of the bottle 3. The finish 12, the neck 14, the bell 16, the shoulder 18, the label portion 10, the grip portion 8, and the base 24*e* can each define a respective perimeter or circumference (substantially perpendicular to the central axis 25) corresponding to that portion. For example, the label portion 10 has a label portion perimeter. As another example, the grip portion 8 has a grip portion perimeter.

In the embodiment illustrated in FIG. 21, each of the grip portion ribs 3*b* comprises a deep rib 2*c* section transitioning to a middle section then to a flattened and/or shallow rib 6*c* sections. As FIG. 21 illustrates, each of the label panel ribs 20*b* can comprise a deep rib 2*d* section transitioning to a middle section then to a flattened and/or shallow rib 6*d* sections. A varying depth grip portion rib 3*b* transitions from a deep rib 2c section to a middle rib/section then to a flattened and/or shallow rib 6b section. A varying depth label panel rib 20b transitions from a deep rib 2d to a middle rib/section then to a flattened and/or shallow rib 6d. The one or more flattened and/or shallow ribs 6c,d form an equivalent of recessed columns 7c at portions where a plurality flattened and/or shallow ribs 6c,d substantially vertically line up along the vertical or central axis 25 of the bottle 3 as illustrated in FIG. 21. A plurality of deep ribs 2c,d substantially vertically line up along the vertical or central axis 25 of the bottle 3 as illustrated in FIG. 21.

In some embodiments, the flattened and/or shallow ribs 6d of the label panel ribs 20b are vertically misaligned with the flattened and/or shallow ribs 6a of the grip portion ribs 3b such that the label portion 10 has a set of recessed columns and the grip portion 8 has another set of recessed columns. Thus, the recessed column of the label portion 10 can be vertically misaligned from the recessed columns of the grip portion 8. In some embodiments, the bottle 3 can have recessed columns in just the grip portion 8 or just the label panel portion 10.

In the illustrated embodiment with four lined-up flattened and/or shallow ribs 6a,b, the bottle respectively has four recessed columns 7c on each flat wall of the square bottle. The four recessed columns 7c may be equally spaced apart around the perimeter of the bottle 3 and located on the opposite sides of the bottle 3 with respect to each other. With four equally spaced recessed columns 7c, the recessed columns 7c are spaced every 90 degrees around the bottle 3 perimeter. The four recessed columns 7c are positioned on the flat portions of the sidewalls of the bottle 3. Any number of recessed columns 7c may be incorporated into a design of the bottle 3 by increasing or decreasing the number of flattened and/or shallow ribs 6c,d that substantially vertically line up along the vertical or central axis 25. For instance, the bottle may have as few as 1 or up to 10 recessed columns 7c, including 2, 3, 4, 5, 6, 7, 8, or 9 recessed columns 7c, including ranges bordered and including the foregoing values. The collections of flattened and/or shallow ribs 6c,d that form recessed columns 7c provide resistance to leaning, load crushing, and/or stretching as discussed herein. The recessed columns 7c transfer the resulting tangential or compression forces along the wall to the base 24e and increase bottle 3 rigidity.

Figure 22:
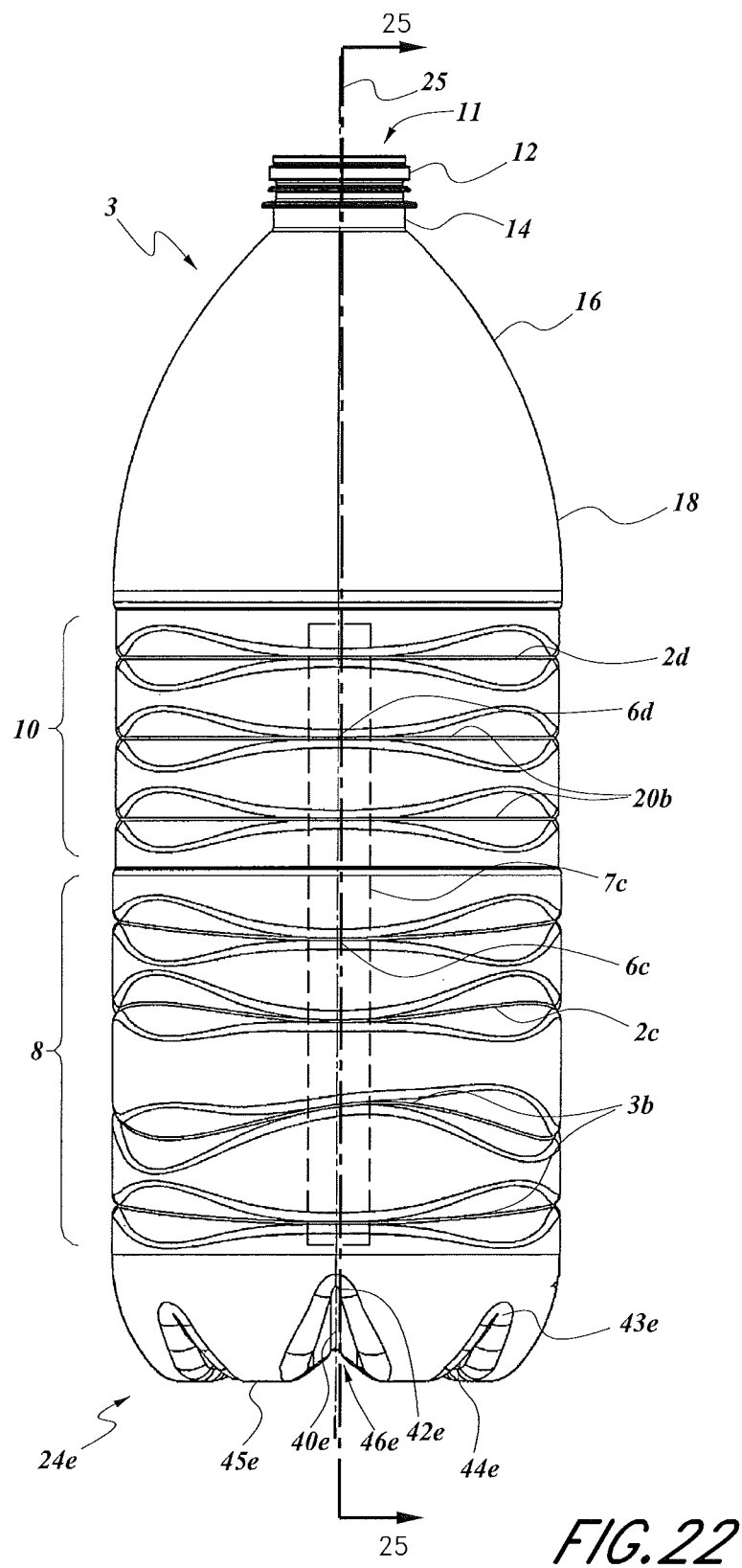
FIG. 22 illustrates a side view of another embodiment of a bottle.

The shape of the square bottle adds hoop strength to the bottle 3 by having four corners. The deep ribs 2c,d of the grip portion ribs 3b and label panel ribs 20b can complement the hoop strength by providing additional hoop strength. As shown in FIG. 22, the deep ribs 2c,d may be positioned on the corners of the sidewall of the bottle 3. At the corners, the deep ribs 2c,d can inhibit flexing of the flat sidewall portions of the bottle 3. The flat sidewall portions may act as membranes and flex radially outwardly under internal pressurization of the bottle 3. The deep ribs 2c,d positioned at the corners of the bottle 3 function as horizontal strap ribs as discussed herein to inhibit deformation due to internal pressure. The deep ribs 2c,d positioned at the corners can also inhibit inward radial flexing of the flat portions of the wall from external stresses and/or forces, such as, for example, from a user gripping the bottle. The deep ribs 2c,d can inhibit the inward flexing of the flat sidewall portions with or without internal pressurization of the bottle 3. Thus, the deep ribs 2c,d can help prevent rounding of the square bottle 3.

The number of ribs, including base ribs 22, grip portion ribs 3b, and/or label panel ribs 20b may vary from 1 to 30 ribs every 10 centimeters of any rib containing portion of the bottle, such as, but not limited to the grip portion 8 and/or label panel portion 10, including 1, 2, 3, 4, 5, 6, 7, 8, 9, 10, 11, 12, 13, 14, 15, 16, 17, 18, 19, 20, 21, 22, 23, 24, 25, 26, 27, 28, or 29 ribs every 10 centimeters, including ranges bordered and including the foregoing values. The aforementioned 10 centimeter section that is used to measure the number of ribs need not be actually 10 centimeters in length. Rather, 10 centimeters is used illustratively to provide a ratio for the number of ribs.

FIG. 22 illustrates a side view of an embodiment of the bottle 3. As shown in FIG. 22, the grip portion ribs 3b may angulate around the perimeter of the bottle 3. The label panel ribs 20b may be straight around the perimeter of the bottle 3. The base 24e has a strap rib 40e. The strap rib 40e has a sidewall end 42e that terminates along the sidewall of the bottle 3 as discussed herein or near or at a transition from the base 24e to the sidewall of the bottle 3. The base has 24e has a load rib 44e. As illustrated in FIG. 22, the base 24e can have one load rib 44a for every one strap ribs 40a. In some embodiments, the base 24e can have 2, 3, 4, and 5 load ribs 44a between two strap ribs 40a. The load rib 44e has a sidewall end 43e that terminates in the base 24e or near or at a transition from the base 24e to the sidewall of the bottle 3. As illustrated in FIG. 22, the sidewall end 43e of the load rib 44e may be vertically lower than the sidewall end 42e of the strap rib 40e along the central axis 25. In some embodiments, the sidewall end 43e of the load rib 44e may terminate along the sidewall of the bottle 3 at a same height as to the sidewall end 42e of the strap rib 40e. The base 24e has feet 45e formed between the strap ribs 40e and the load ribs 44e.

The strap rib 40e is relatively larger and deeper than the strap rib 44e as discussed herein. As illustrated in FIG. 22, the strap base rib 40e may vertically align with the recessed columns 7c. Where a bottle 3 has four recessed columns 7c, the base 24e can have four strap ribs 40e. The strap ribs 40e are space equally around the circumference of the bottle 1. With four equally spaced strap ribs 40e, the strap ribs 40e are positioned every 90 degrees around the bottle circumference. The load ribs 44e can vertically align with the grip portion ribs 3b between the recessed columns 7c. As shown in FIG. 22, the load ribs 44e may vertically align with the deep ribs 6c,d. In some embodiments, the strap ribs 40e may be vertically misaligned with the recessed columns 7c. In some embodiments, the strap ribs 40e may be spaced unequally around the bottle circumference. In some embodiments, the base 24a may have more or less strap ribs 40a than the number of recessed columns 7e.

The sidewall end 42e of the strap rib 40e vertically aligns or points to substantially the center of the recessed columns 7c (center point of the shallow and/or flattened ribs 2c,d). As illustrated in FIG. 22, the strap rib 40e forms a recess 46e from a side view perspective. The strap rib 40e can extend substantially from a central portion of the base 24e (from the central axis 25) as discussed herein. The strap rib 40e can act as a strap between the recessed columns 7c of the sidewall to the central portion of the base 24e. As shown in FIG. 22, the strap rib 40e provides a more direct and shorter path to the center of the base 24a from the sidewall of the bottle 3 without proceeding to the vertical level of the feet 45e. As discussed herein, strap rib 40e thus provides relatively more pressure resistant base 24e. The strap rib 40e provides a link for forces and stresses between the sidewall, including the recessed column 7c, and the central portion of the base 24e.

Figure 23:
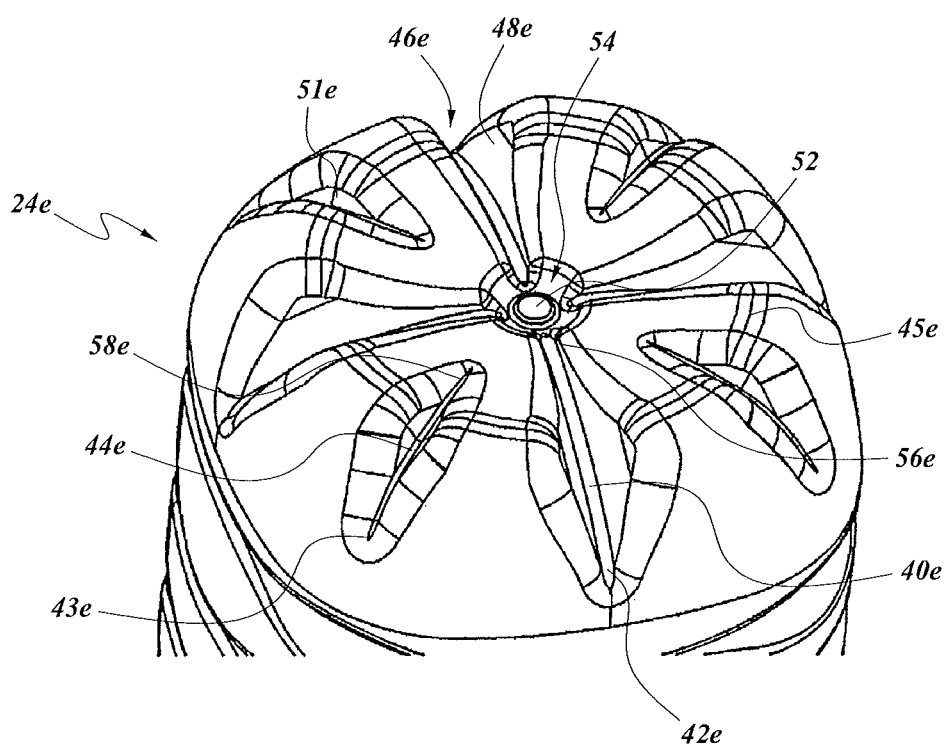
FIG. 23 illustrates a bottom perspective view of another embodiment of a base.

FIG. 23 illustrates a bottom perspective view of an embodiment of the base 24e. The base 24e has a strap rib 40e and a load rib 44e as discussed herein. The base 24e has a gate 52. As shown in FIG. 22, the base 24e may have a dome 54. The strap rib 40e has a base end 56e that terminates near, at, or in the dome 54. The strap rib 40e has a petal wall (i.e., valley wall) 48e that connects that strap rib 40e to portions of the base 24e and the feet 45e of the base 24a. The petal wall 48a smoothly and gradually transitions into the base 24e and the feet 45e. The smooth and gradual transition provides internal pressure resistance at and near the petal wall 48e since more spherical features of the bottle 1 can better accommodate internal pressure. The strap rib 40a is relatively deeper in the base 24e than the load rib 58e to provide stress transfer and pressure resistance as discussed herein.

The load rib 44e has a base end 58e that terminates at near or at the dome 54. As shown in FIG. 22, the base end 58e of the load rib 44e may terminate before the base end 56e of the strap rib 40e. The base end 58e of the load rib 44e may terminate at wall portion of the base 24e before reaching the dome 54. The load rib 44e is shallow relative to the strap rib 40e. As shown in FIG. 22, the load rib 44e may have a petal 51e feature similar as discussed herein with reference to the strap rib 40a. The petal 51e of the load rib 44e may be relatively smaller than the petal 48e of the strap rib 40e as the strap rib 40e is designed to mostly resist internal pressure while the load rib 44e is designed to resist mostly external pressure or forces. The transition from load rib 44e to the base 24e and the feet 45e is more abrupt or sharper in comparison with the strap rib 44e and in particular, the petal 48e. The sharper transition provides external stress resistance. When the bottle 3 is top loaded during packaging, shipping, and/or handling, sharper transitions of the load ribs 44e help resist bending and/or leaning as discussed herein by, for example, maintaining the integrity and shape of the base 24e.

The sharper transitions provide for faster transitions into the feet 45e of the base 24e. Faster transitions lead to more area of the base 24e being available for relatively larger feet 45e. Larger feet 45e of a flat foot base 24e as discussed herein and as illustrated in FIG. 22 provide more resin contact area with a resting surface. More resin contacting the resting surface provides better abrasion resistance and stability of the base 24e.

As shown in FIG. 22, the petal wall 48e may transition into the strap rib 40e more abruptly or sharply relative to the transition from the petal 48e to the feet 45e. The sharper transitions at the strap rib 40e itself may provide more rigidity to the strap rib 40e to resist or inhibit flexing due to internal pressures as discussed herein.

Figure 24:
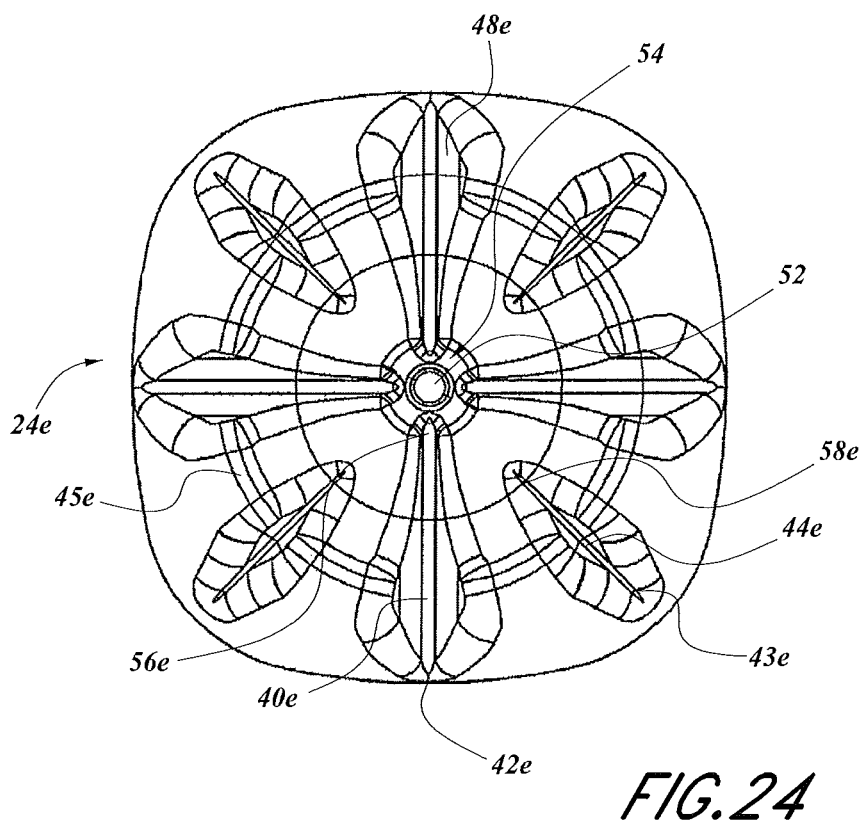
FIG. 24 illustrates a bottom view of another embodiment of a base.

FIG. 24 illustrates a bottom view of an embodiment of the base 24e. As shown in FIG. 22, the strap ribs 44e may align to provide a resistance strap or band 9e (FIG. 25) substantially along middle portions of the flat sidewall segments of the square bottle 3 as discussed herein. The four strap ribs 44e complement the deep ribs 2c,d at the sidewall corners to help prevent the square bottle 3 from rounding along the flat portions of the sidewalls.

FIG. 25 illustrates a cross-section along the central axis 25 of an embodiment of the bottle 3 as illustrated in FIG. 22. As shown in FIG. 25, a flat rib or recessed column 7e is located on an opposite side of the bottle perimeter of another recessed column 7e. In some embodiments, the diameter Ld of the base 24 is larger by 0.5 to 2 millimeters, 0.6, 0.7, 0.8, 0.9, 1, 1.1, 1.2, 1.3, 1.4, 1.5, 1.6, 1.7, 1.8, or 1.9 millimeters, including ranges bordered and including the foregoing values, than any other diameter of the bottle 3. In an embodiment with the largest diameter of the bottle 3 being Ld, the bottle 3 has a single point of contact at just the base 24e with other substantially similar bottles in a production line and/or packaging. Further, a larger base 24e diameter Ld may improve stability when there is any damage to the base 24e. As shown in FIG. 22, the diameter Ls at the shoulder 18 may be equal to the diameter Ld, which provides for two points of contact, at the shoulder 18 and base 24e, with other substantially similar bottles in a production line and/or packaging. In some embodiments, the diameter(s) in any portion of the bottle 3 varies, where the largest diameters create points of contact in a production line and/or packaging. The bottles may have either a single point of contact or multiple points of contact.

As shown in FIG. 22, the strap ribs 40e may vertically align with the recessed columns 7e. The strap ribs 40e and recessed column 7e in combination can form a pressure resistance band 9e that substantially extends from a top portion of the label portion 10 or the top portion of the recessed column 7e on one side of the bottle 3 to the base 24e and through the gate 52 along the base 24e to a top portion of the label portion 10 or the top portion of the recessed column 7e on the other side of the bottle 3. The pressure resistance band 9e provides resistance against internal pressure substantially for the base 24e and sidewalls of the bottle 3 such as, for example, inhibit stretching, sidewall flexing, and/or base rollout as discussed herein. Stated differently, the pressure resistance band 9e extends from a top portion of the label portion 10 on one side of the bottle 3, down the sidewall on the one side of the bottle 3 and through the gate 52, up the sidewall on the other side of the bottle 3 to a top portion of the label portion 10 on the other side of the bottle 3 to provide pressure resistance as discussed here and substantially continuously through a longitudinal perimeter of the bottle 3 (along the central axis 25 at the sidewalls and through the central axis at the base 24e).

Figure 26:
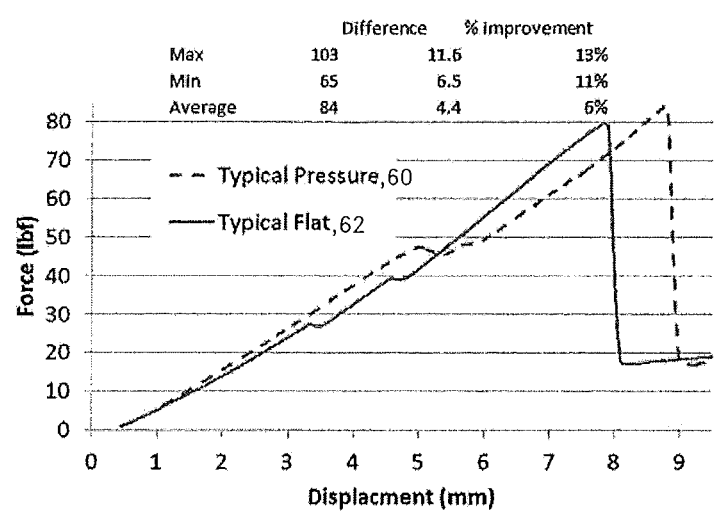
FIG. 26 is a table and graph showing an increase in top load resistance of bottles.

FIG. 26 is a table and graph showing an increase in top load resistance in lbf. with increased pressure in a bottle 1,3. The maximum top load increased by 13% for certain bottles, and the minimum top load increases by 11% for certain bottles, with an average increase of 6%. The y-axis of the graph shows top load pressure applied to the bottle in lbf. The x-axis of the graph shows the displacement performance of the bottle under the corresponding top load pressure. Curve 60 shows top load performance of the bottle under typical pressure or pressurization inside the bottle. Curve 62 shows top load performance of the bottle under typical flat pressure or no pressurization inside the bottle. The graph illustrates a stiffer initial performance of the bottles (up to about 50, 40, and 30 lbf. (222, 178, 133 newtons, respectively)) and a delayed reversible failure of some bottle embodiments (at about 50, 40, and 30 lbf. (222, 178, 133 newtons, respectively)) disclosed herein. Performance improvements can be greater with some embodiments. At the forces and/or pressures illustrated in the graph, the bottles show minimal or no permanent deformation. The bottles rebound to a desired shape after a deforming force is released. This is beneficial for rough handling during packaging, shipping, and/or handling, such as, for example, in the warehouse or shipping lane.

Figure 27:
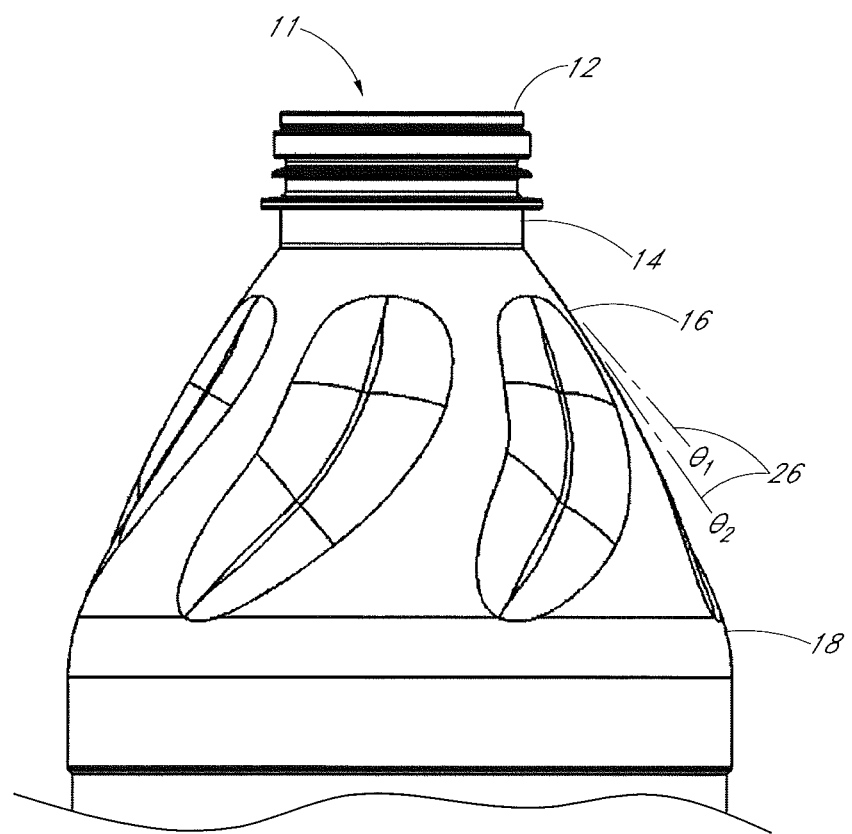
FIG. 27 illustrates an embodiment showing angles of a bell.

Referring to FIG. 27, the bell 16 may have various bell angles 26 as measured from the vertical wall of the finish 12 to the downward sloping wall of the bell 16. The bell angle 26 may be obtuse, varying from 120 to 175 degrees, including 122, 125, 127, 130, 132, 135, 137, 140, 142, 145, 147, 150, 152, 155, 157, 160, 162, 165, 167, 170, or 172 degrees, including ranges bordered and including the foregoing values. The bell angle 26 represented by $\theta 2$ is larger than the bell angle 26 represented by $\theta 1$. The wall of bell 16 with $\theta 2$ bell angle 26 is steeper than the wall of bell 16 with θ1 bell angle 26. A steeper wall of bell 16 can increase the top load capacity of the bottle 1 while maintaining the same or even decreasing bell 16 wall thickness. A steeper bell angle 26 aids in resin of a preform to touch the preform mold more quickly (relative to a less steep angle) during the blow molding process. When the resin touches the preform mold more quickly, more of resin is quenched earlier to remain in the sidewalls of the bottle, leading to thicker sidewalls. Thicker sidewalls can help increase top load and pressure resistance performance as discussed herein.

Figure 28:
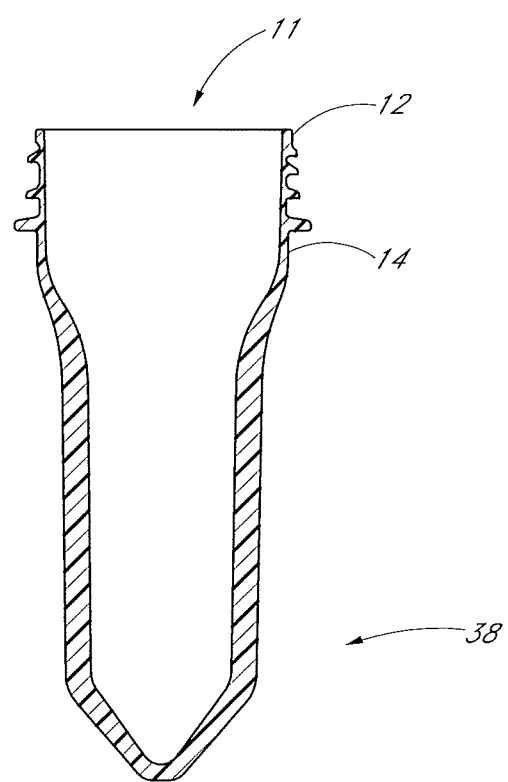
FIG. 28 illustrates a preform of a bottle.

Referring to FIG. 28, an embodiment of the bottle 1 may use a preform 38 with a thin wall finish 12 and a thin wall neck 14 to form a lightweight bottle. A thin wall neck 14 improves the ability to blow efficient, lightweight bottles. A thin wall neck 14 is a feature that aids in protecting critical dimensions of the bottle and stabilizing the production blowing process. A thin wall neck 14 can also utilize less resin while achieving the desired mechanical performance resulting in a reduction in the use of petroleum products by the industry. A thin wall neck 14 of preform 38 can aid in forming bottles 1 with larger bell angles 26 and/or steeper bell 16 walls as discussed above. As also discussed above, steeper, but relatively thinner, bell 16 walls can support greater top load forces, which can be transferred to the base 24 via the recessed columns. Thus, embodiments disclosed herein may incorporate thicker base 24 designs and/or thicker sidewall designs to withstand greater top load forces even when damaged, while using the same or less amount of resin. Achieving a thicker base 24 and/or thicker sidewalls is aided by a thin wall neck 14 and thin bell 16 walls.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "passing a suspension line through the base of the tongue" include "instructing the passing of a suspension line through the base of the tongue." It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the following disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" or "one of the A, B, or C," etc. is used, in general such a construction is intended in the sense one having skill in the art would understand the convention (e.g., "a system having at least one of A, B, and C (or one of the A, B, or C)" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A container comprising a flat foot base having strap ribs and a sidewall having recessed columns, the strap ribs and recessed columns vertically lined up to resist deformation in the base and the sidewall, the container comprising:
    a flat foot base comprising a gate, a wall, and flat feet, the gate centered on a central axis of the container, the wall extending from the gate toward a resting surface of the container, the flat feet extending from the wall to the resting surface;
    a substantially square sidewall connected to the base, the sidewall extending substantially along the central axis to define at least part of an interior of the container, wherein the sidewall comprises corners and flat portions between the corners;
    a bell connected to the sidewall and leading upward and radially inward to a finish connected to the bell, the bell comprising an obtuse angle as measured from a central axis to a wall of the bell of at least 120 degrees;
    a plurality of strap ribs positioned in the base between the flat feet, the strap ribs extending radially outward from at least one of the gate or the wall toward the sidewall, the strap ribs sloping upward relative to the resting surface toward the sidewall from the at least one of the gate or the wall to resist deformation of the base, the strap ribs configured so as to resist pressurization pressures in the container of up to 3 bars;
    wherein a periphery of the sidewall is substantially perpendicular to a central axis, the periphery being defined by a label portion comprising a label portion perimeter, and a grip portion comprises a grip portion perimeter;
    a plurality of recessed columns positioned in the sidewall, the recessed columns comprising sidewall ribs extending along a periphery of the sidewall and centered about the central axis, wherein portions of the sidewall between the sidewall ribs are substantially continuous along the periphery of the sidewall, the recessed columns configured to resist at least one of bending, leaning, crumbling, or stretching along the sidewall; and
    wherein the strap ribs and the recessed columns vertically line up along the central axis to form pressure resistance bands such that each pressure resistance band comprises a strap rib vertically lined up along the central axis with a recessed column, the pressure resistance bands configured to communicate forces on the container vertically along the container between the base and the sidewall to continuously resist deformation in the base and the sidewall;
    wherein the plurality of recessed columns comprises four recessed columns positioned in the sidewall equidistantly around the periphery of the square sidewall such that each pressure resistance band further comprises another strap rib radially extending 180 degrees opposite the strap rib, the other strap rib vertically lined up along the central axis with another recessed column; and
    sidewall ribs comprising a plurality of varying depth ribs positioned along the periphery of the sidewall, wherein each varying depth rib comprises shallow sections and deep sections, the shallow sections having a rib depth less than a rib depth of the deep sections, wherein the shallow sections of the plurality of varying depth ribs vertically line up along the central axis to form the recessed columns, and wherein the deep sections are positioned at the four corners of the square sidewall, the deep sections configured to resist rounding of the square sidewall at the flat portions.

2. The container of claim 1, wherein the strap ribs extend radially outward from the wall of the base.

3. The container of claim 1, wherein the strap ribs extend radially outward from the gate of the base.

4. The container of claim 1, wherein the base further comprises a plurality of load ribs positioned between the strap ribs, the load ribs having a depth toward the interior of the container shallower than a depth of the strap ribs, the load ribs configured to resist deformation of the base when external forces are applied to the container.

5. The container of claim 1, wherein the sidewall ribs comprise a plurality of varying depth ribs positioned along the periphery of the sidewall, wherein each varying depth rib comprises shallow sections and deep sections, the shallow sections having a rib depth less than a rib depth of the deep sections, wherein the shallow sections of the plurality of varying depth ribs vertically line up along the central axis to form the recessed columns.

6. The container of claim 5, wherein the shallow sections have a rib depth of substantially zero from the periphery of the sidewall.

7. The container of claim 1, wherein the sidewall is substantially round about the periphery of the sidewall, and wherein the plurality of recessed columns comprises three recessed columns positioned in the sidewall equidistantly around the periphery of the round sidewall.

8. The container of claim 7 wherein the three recessed columns are positioned in the grip portion, and the plurality of recessed columns further comprises six recessed columns positioned in the label portion equidistantly around the periphery of the round sidewall, the six recess columns in the label portion configured to inhibit triangulation of the container, wherein three of the six recess columns in the label portion and the three recessed columns in the grip portion vertically line along the central axis.

9. The container of claim 7, wherein the plurality of strap ribs comprises three strap ribs positioned in the base equidistantly from each other, and wherein the three strap ribs and the three recessed columns vertically line up along the central axis.

10. The container of claim 7, wherein the plurality of strap ribs comprises six strap ribs positioned in the base equidistantly from each other, three of the six strap ribs and the three recessed columns vertically lined up along the central axis, and wherein the six strap ribs are configured to inhibit triangulation of the container.

11. A container comprising a flat foot base having strap ribs and a sidewall having recessed columns, the strap ribs and recessed columns vertically lined up to resist deformation in the base and the sidewall, the container comprising:
    a flat foot base comprising a gate, a dome, and flat feet, the gate centered on a central axis of the container, the dome extending from the gate toward a resting surface of the container without contacting the resting surface, the dome surrounding the gate about the central axis, the flat feet extending from the dome to the resting surface;

a substantially square sidewall connected to the base, the sidewall extending substantially along the central axis to define at least part of an interior of the container;

a bell connected to the sidewall and leading upward and radially inward to a finish connected to the bell;

a plurality of strap ribs positioned in the base between the flat feet, the strap ribs extending radially outward from at least one of the gate or the dome toward the sidewall, the strap rib sloping upward relative to the resting surface toward the sidewall from the at least one of the gate or the dome to resist deformation of the base;

wherein a periphery of the sidewall is substantially perpendicular to a central axis, the periphery being defined by a label portion comprising a label portion perimeter, and a grip portion comprises a grip portion perimeter;

a plurality of recessed columns positioned in the sidewall, the recessed columns comprising sidewall ribs extending along a periphery of the sidewall and centered about the central axis, wherein portions of the sidewall between the sidewall ribs are substantially continuous along the periphery of the sidewall, the recessed columns configured to resist at least one of bending, leaning, crumbling, or stretching along the sidewall; comprising four recessed columns positioned in the sidewall equidistantly around the periphery of the square sidewall; and sidewall ribs comprising a plurality of varying depth ribs positioned along the periphery of the sidewall, wherein each varying depth rib comprises shallow sections and deep sections, the shallow sections having a rib depth less than a rib depth of the deep sections, wherein the shallow sections of the plurality of varying depth ribs vertically line up along the central axis to form the recessed columns, and wherein the deep sections are positioned at the four corners of the square sidewall, the deep sections configured to resist rounding of the square sidewall at the flat portions;

a protruding column that radially protrudes outward from an immediately surrounding surface formed by the sidewall; and wherein the strap ribs and the recessed columns vertically line up along the central axis to form pressure resistance bands such that each pressure resistance band comprises a strap rib vertically lined up along the central axis with a recessed column, the pressure resistance bands configured to communicate forces on the container vertically along the container between the base and the sidewall to continuously resist deformation in the base and the sidewall.

12. The container of claim 11, wherein the strap ribs extend radially outward from the gate of the base.

13. The container of claim 11, wherein the strap ribs extend radially outward from the dome of the base.

14. The container of claim 11, wherein the base further comprises a plurality of load ribs positioned between the strap ribs, the load ribs having a depth toward the interior of the container shallower than a depth of the strap ribs, the load ribs configured to resist deformation of the base when external forces are applied to the container.

15. The container of claim 14, wherein the load ribs extend radially outward from at least one of the gate or the dome.

16. The container of claim 11, wherein the sidewall ribs comprise a plurality of varying depth ribs positioned along the periphery of the sidewall, wherein each varying depth rib comprises shallow sections and deep sections, the shallow sections having a rib depth less than a rib depth of the deep sections, wherein the shallow sections of the plurality of varying depth ribs vertically line up along the central axis to form the recessed columns.

17. The container of claim 16, wherein the shallow sections have a rib depth of substantially zero from the periphery of the sidewall.

\* \* \* \* \*